US012188268B2

(12) United States Patent
Sanchez Rojas et al.

(10) Patent No.: US 12,188,268 B2
(45) Date of Patent: Jan. 7, 2025

(54) VEHICLE DOOR LATCH

(71) Applicant: INTEVA PRODUCTS, LLC, Troy, MI (US)

(72) Inventors: Hector Sanchez Rojas, Chihuahua (MX); Pedro Alfredo Alvarado Heredia, Chihuahua (MX); Carlos Isaac Tostado Bocanegra, Chihuahua (MX); Ari Yussel Mino Ramirez, Chihuahua (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 119 days.

(21) Appl. No.: 18/071,328

(22) Filed: Nov. 29, 2022

(65) Prior Publication Data

US 2024/0151077 A1 May 9, 2024

Related U.S. Application Data

(60) Provisional application No. 63/422,239, filed on Nov. 3, 2022.

(51) Int. Cl.

| | |
|---|---|
| ***E05B 81/90*** | (2014.01) |
| ***E05B 81/06*** | (2014.01) |
| ***E05B 81/14*** | (2014.01) |
| ***E05B 81/30*** | (2014.01) |
| ***E05B 81/34*** | (2014.01) |
| ***E05B 81/42*** | (2014.01) |
| ***E05B 81/56*** | (2014.01) |
| ***E05B 83/36*** | (2014.01) |

(52) U.S. Cl.
CPC .............. *E05B 81/90* (2013.01); *E05B 81/06* (2013.01); *E05B 81/14* (2013.01); *E05B 81/30* (2013.01); *E05B 81/34* (2013.01); *E05B 81/42* (2013.01); *E05B 81/56* (2013.01); *E05B 83/36* (2013.01)

(58) Field of Classification Search
CPC .......... E05B 81/00; E05B 81/02; E05B 81/04; E05B 81/06; E05B 81/12; E05B 81/14; E05B 81/15; E05B 81/24; E05B 81/26; E05B 81/28; E05B 81/30; E05B 81/32; E05B 81/34; E05B 81/42; E05B 81/44; E05B 81/54; E05B 81/56; E05B 81/58; E05B 81/90; E05B 83/00; E05B 83/36
USPC ........................................................ 70/278.7
See application file for complete search history.

(56) References Cited

U.S. PATENT DOCUMENTS

2003/0234544 A1* 12/2003 Jankowski ............. E05B 77/06 292/220
2007/0210588 A1* 9/2007 Cetnar .................... E05B 77/26 292/216

(Continued)

OTHER PUBLICATIONS

CNIPA First Office Action corresponding to CN Application No. 202322971089.3; Issue Date, May 13, 2024.

(Continued)

*Primary Examiner* — Nathan Cumar
(74) *Attorney, Agent, or Firm* — CANTOR COLBURN LLP

(57) ABSTRACT

A vehicle latch, including: only a single motor the single motor performing a release/back drive function of the vehicle latch, power lock/unluck function of the vehicle latch, and a mechanical lock/unlock feature in the event of a power loss to the vehicle latch.

20 Claims, 35 Drawing Sheets

(56) References Cited

U.S. PATENT DOCUMENTS

| | | | | |
|---|---|---|---|---|
| 2011/0204673 | A1* | 8/2011 | Cumbo | E05B 81/06<br>70/141 |
| 2012/0061976 | A1 | 3/2012 | Tostado et al. | |
| 2014/0360235 | A1 | 12/2014 | Taurasi et al. | |
| 2016/0245000 | A1* | 8/2016 | Ottino | E05B 81/18 |
| 2016/0362916 | A1 | 12/2016 | Tomaszewski | |
| 2017/0138097 | A1* | 5/2017 | Patel | E05B 19/0082 |
| 2017/0342749 | A1* | 11/2017 | Nelson | E05B 85/243 |
| 2018/0171677 | A1 | 6/2018 | Im et al. | |
| 2019/0024420 | A1 | 1/2019 | Nagata et al. | |
| 2019/0271180 | A1 | 9/2019 | Sardelli et al. | |
| 2019/0351953 | A1* | 11/2019 | Stokes | B62D 63/08 |
| 2020/0115932 | A1* | 4/2020 | Ottino | E05B 81/01 |
| 2020/0347649 | A1* | 11/2020 | Nam | E05B 79/08 |
| 2021/0108449 | A1* | 4/2021 | Pilested | E05B 81/14 |
| 2022/0298835 | A1 | 9/2022 | Taurasi et al. | |

OTHER PUBLICATIONS

CNIPA First Office Action corresponding to CN Application No. 202322973644.6; Issue Date, May 13, 2024.

* cited by examiner

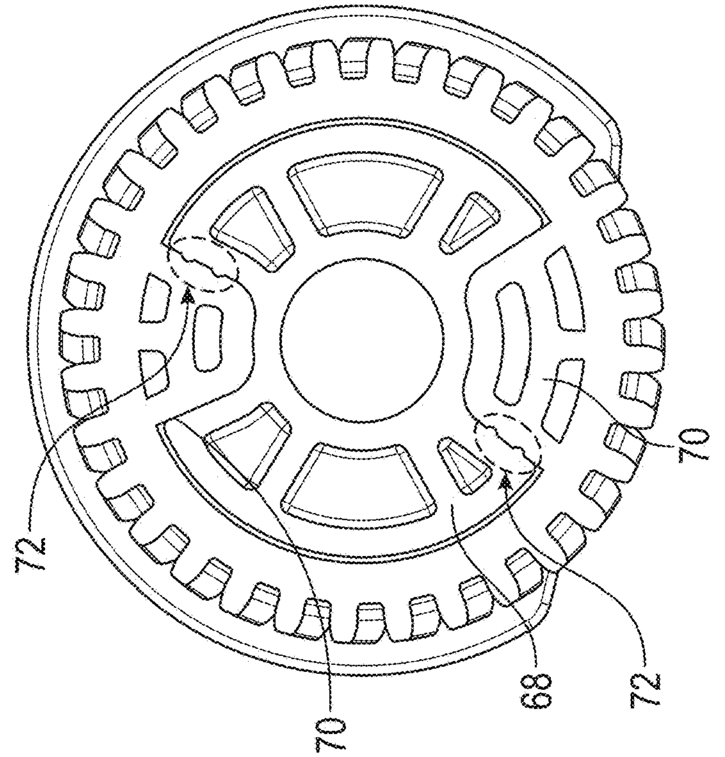
FIG. 2D'
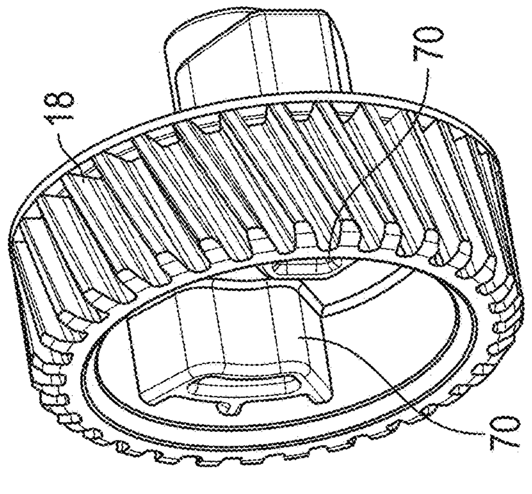
FIG. 2D
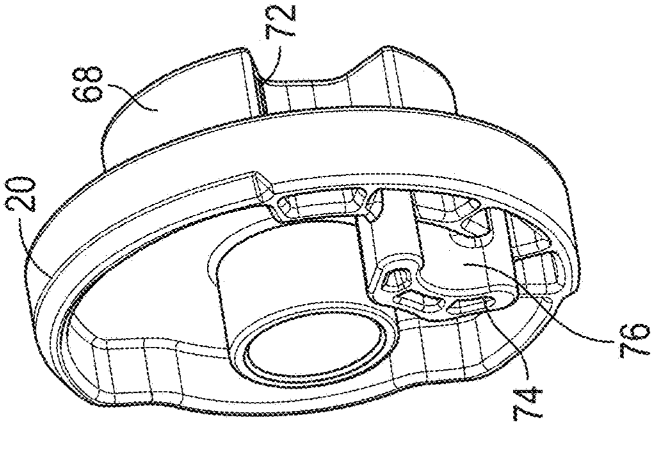

VEHICLE DOOR LATCH

CROSS REFERENCE TO RELATED APPLICATIONS

This application claims the benefit of U.S. Provisional Patent Application No. 63/422,239 filed on Nov. 3, 2022, the contents of which are incorporated herein by reference thereto.

BACKGROUND

Exemplary embodiments of the present disclosure pertain to the art of vehicle door latches.

Vehicle door latches include multiple components that cooperate with each other in order to provide operation of the vehicle door latch.

The automotive industry has become more and more competitive and complex. Thus, the closure systems need to rise to the challenge and become even more capable of improving their functionality by providing more in-depth functions that increase their reliability and their overall quality.

Reducing the number of components in a latch assembly and using them or using them for multiple functions is a difficult task to accomplish.

The closure systems are required to offer the final user the confidence that their vehicle door will open and close only when expected, ensuring their security on the road and when the vehicle is parked.

As such, it is desirable to provide an improved vehicle door latch wherein the latch which can operate as desired while reducing the number of components required for operation of the latch.

BRIEF DESCRIPTION

The proposed concept allows the latch to perform the power release/back drive function and power lock/unlock function using the same motor, in addition, it also contains the availability of performing mechanical lock/unlock in the event of a power loss. The single-motor removes the need to include a second motor which would affect the packaging of the latch so that it can continue to be compatible with many vehicles. It also highly influences the cost of the final product, making it competitive.

The proposed concept accomplishes essential functions while providing a more premium experience through an electrical performance, which allows functions such as power release, cinching, and lock/unlock, ensuring a pleasant interaction between the latch and the final user.

Disclosed is a vehicle latch, including: only a single motor the single motor performing the release/back drive function of the vehicle latch, power lock/unluck function of the vehicle latch, and mechanical lock/unlock of the vehicle latch in the event of a power loss.

Also disclosed is a vehicle latch, including: a drive assembly; a motor operably coupled to the drive assembly via a worm secured to a shaft of the motor, wherein rotation of the drive assembly by the worm performs one of a locking function and a power release of the vehicle latch.

In addition to one or more of the features described above, or as an alternative to any of the foregoing embodiments, the drive assembly includes a power release gear, a reset lever secured to one side of the power release gear and a gear lock lever located on an opposite side of the power release gear, the gear lock lever being capable of independent movement with respect to the power release gear and the reset lever.

In addition to one or more of the features described above, or as an alternative to any of the foregoing embodiments, a surface of the power release gear has a cam feature that engages a bumper of the gear lock lever when the drive assembly of the vehicle latch is in a locked position and the gear lock lever is in a home position.

In addition to one or more of the features described above, or as an alternative to any of the foregoing embodiments, the gear lock lever has an upper tab member operably coupled to a switch link that is movably mounted to an actuator housing of the vehicle latch.

In addition to one or more of the features described above, or as an alternative to any of the foregoing embodiments, the upper tab member is received within an opening of the switch link.

In addition to one or more of the features described above, or as an alternative to any of the foregoing embodiments, the gear lock lever has a lower portion that has a "U" shaped receiving area operably coupled to a tab of a lock link lever movably mounted to a housing portion of the vehicle latch.

In addition to one or more of the features described above, or as an alternative to any of the foregoing embodiments, the actuator housing and the housing portion of the vehicle latch are separate components secured to each other.

In addition to one or more of the features described above, or as an alternative to any of the foregoing embodiments, the actuator housing and the housing portion of the vehicle latch are integrally formed together as a single integral latch housing portion.

In addition to one or more of the features described above, or as an alternative to any of the foregoing embodiments, movement of the lock link lever from a first position to a second position will allow the vehicle latch to be opened by an outside release lever pivotally mounted to the housing portion.

In addition to one or more of the features described above, or as an alternative to any of the foregoing embodiments, the outside release lever is operably coupled to a handle.

In addition to one or more of the features described above, or as an alternative to any of the foregoing embodiments, the outside release lever is operably coupled to the handle via a cable.

In addition to one or more of the features described above, or as an alternative to any of the foregoing embodiments, the lock link lever rests in a backplate and the lock link lever has two guide features that slide though two slots in the backplate.

In addition to one or more of the features described above, or as an alternative to any of the foregoing embodiments, when the power release gear is in a first position, the cam feature of the power release gear contacts the bumper of the gear lock lever which maintains the gear lock lever in the home position, which corresponds to the locked position of the drive assembly of the vehicle latch.

In addition to one or more of the features described above, or as an alternative to any of the foregoing embodiments, when the power release gear is rotated and the cam feature no longer contacts the bumper the gear lock lever, the gear lock lever is spring biased into an unlock position by a lock link spring which provides a biasing force to a lock link lever movably mounted to a housing portion of the vehicle latch.

In addition to one or more of the features described above, or as an alternative to any of the foregoing embodiments, a switch link spring provides a biasing force to the switch link such that the lock link spring and the switch link spring will cause the gear lock lever to rotate when the power release gear is rotated and the cam feature no longer contacts the bumper the gear lock lever.

In addition to one or more of the features described above, or as an alternative to any of the foregoing embodiments, the reset lever has a cam feature that is configured to engage complimentary cam features of the power release gear such that the reset lever can be secured to the power release gear.

In addition to one or more of the features described above, or as an alternative to any of the foregoing embodiments, the cam feature of the reset lever has crush ribs that allows the reset lever to be interference fit or snap fit into the power release gear.

In addition to one or more of the features described above, or as an alternative to any of the foregoing embodiments, the reset lever cam has another cam feature provided on an opposite side of the reset lever with respect to the cam feature, the another cam feature defining a recessed area that receives a bump portion of a spring.

In addition to one or more of the features described above, or as an alternative to any of the foregoing embodiments, the bump portion engages the recessed area when the reset lever is rotated into an unlock position.

Also disclosed is a vehicle latch, including: a drive assembly, the drive assembly includes a power release gear, a reset lever secured to one side of the power release gear and a gear lock lever located on an opposite side of the power release gear, the gear lock lever being capable of independent movement with respect to the power release gear and the reset lever; a motor operably coupled to the drive assembly via a worm secured to a shaft of the motor, wherein rotation of the drive assembly by the worm performs one of a locking function and a power release of the vehicle latch; a lock link lever, movably mounted to a housing portion of the vehicle latch, and the gear lock lever has a lower portion that has a receiving area operably coupled to a tab of a lock link lever; a key cylinder lever, pivotally mounted to the latch housing portion, the key cylinder lever being operably coupled to a key cylinder via a rod, the key cylinder lever having a tab portion that is received in a receiving area of the lock link lever such that actuation of the key cylinder lever from a first position to a second position will cause the tab portion to contact a wall of the receiving area which causes movement of the lock link lever a locked position to an unlocked position, the key cylinder lever allows for manual unlocking of the vehicle latch; and an emergency lock lever accessible from an exterior of the vehicle latch, the emergency lock lever when actuated will transition the vehicle latch from an unlocked state to a locked state.

In addition to one or more of the features described above, or as an alternative to any of the foregoing embodiments, the emergency lock lever has a post member that is configured to contact a receiving area of the lock link lever.

In addition to one or more of the features described above, or as an alternative to any of the foregoing embodiments, the receiving area of the lock link lever is located on an arm member of the lock link lever.

In addition to one or more of the features described above, or as an alternative to any of the foregoing embodiments, the emergency lock lever also has a feature that contacts a pair of complimentary stop portions of the housing portion of the vehicle latch.

In addition to one or more of the features described above, or as an alternative to any of the foregoing embodiments, an over center spring provides a biasing force in order to keep the emergency lock lever in a locked position, which corresponds to the locked state of the vehicle latch.

In addition to one or more of the features described above, or as an alternative to any of the foregoing embodiments, the emergency lock lever has a feature that is accessible from the exterior of the vehicle latch.

In addition to one or more of the features described above, or as an alternative to any of the foregoing embodiments, a surface of the power release gear has a cam feature that engages a bumper of the gear lock lever when the drive assembly of the vehicle latch is in a locked position and the gear lock lever is in a home position.

In addition to one or more of the features described above, or as an alternative to any of the foregoing embodiments, the gear lock lever has an upper tab member operably coupled to a switch link that is movably mounted to an actuator housing of the vehicle latch.

In addition to one or more of the features described above, or as an alternative to any of the foregoing embodiments, the upper tab member is received within an opening of the switch link.

In addition to one or more of the features described above, or as an alternative to any of the foregoing embodiments, a primary switch is operably coupled to a controller, wherein actuation of the primary switch by an outer periphery of the reset lever will send a signal to the controller that causes the motor to cease operation and indicate to the controller that the vehicle latch is in an unlocked state.

In addition to one or more of the features described above, or as an alternative to any of the foregoing embodiments, a secondary switch is operably coupled to the controller, wherein actuation of the secondary switch by a cam surface of the switch link will send a signal to the controller that causes the motor to cease operation and indicate to the controller that the vehicle latch is in the unlocked state.

In addition to one or more of the features described above, or as an alternative to any of the foregoing embodiments, the reset lever has a recessed periphery that does not contact the primary switch when the reset lever is in a locked position and the outer periphery of the reset lever contacts the primary switch when the reset lever is in an unlocked position.

In addition to one or more of the features described above, or as an alternative to any of the foregoing embodiments, a surface of the power release gear has a cam feature that engages a bumper of the gear lock lever when the drive assembly of the vehicle latch is in a locked position and the gear lock lever is in a home position.

In addition to one or more of the features described above, or as an alternative to any of the foregoing embodiments, the gear lock lever has an upper tab member operably coupled to the switch link.

In addition to one or more of the features described above, or as an alternative to any of the foregoing embodiments, the upper tab member is received within an opening of the switch link.

In addition to one or more of the features described above, or as an alternative to any of the foregoing embodiments, the actuator housing and the housing portion of the vehicle latch are separate components secured to each other.

In addition to one or more of the features described above, or as an alternative to any of the foregoing embodiments, the actuator housing and the housing portion of the vehicle latch are integrally formed together as a single integral latch housing portion.

In addition to one or more of the features described above, or as an alternative to any of the foregoing embodiments, movement of the lock link lever from a first position to a second position will allow the vehicle latch to be opened by an outside release lever pivotally mounted to the housing portion.

In addition to one or more of the features described above, or as an alternative to any of the foregoing embodiments, when the power release gear is in a first position, the cam feature of the power release gear contacts the bumper of the gear lock lever which maintains the gear lock lever in the home position, which corresponds to the locked position of the drive assembly of the vehicle latch and when the power release gear is rotated and the cam feature no longer contacts the bumper the gear lock lever, the gear lock lever is spring biased into an unlock position by a lock link spring which provides a biasing force to a lock link lever movably mounted to a housing portion of the vehicle latch, and a switch link spring provides a biasing force to the switch link such that the lock link spring and the switch link spring will cause the gear lock lever to rotate when the power release gear is rotated and the cam feature no longer contacts the bumper the gear lock lever.

Also disclosed is a method of operating a vehicle latch with only a single motor, including: rotatably mounting a drive assembly to the vehicle latch, the drive assembly having a power release gear, a reset lever secured to one side of the power release gear and a gear lock lever located on an opposite side of the power release gear, the gear lock lever being capable of independent movement with respect to the power release gear and the reset lever; operably coupling the single motor to the drive assembly via a worm secured to a shaft of the single motor, wherein rotation of the drive assembly by the worm performs one of a locking function and a power release of the vehicle latch; movably mounting a lock link lever to a housing portion of the vehicle latch; operably coupling a tab of a lock link lever to a lower portion of the gear lock lever; pivotally mounting a key cylinder lever to the latch housing portion, the key cylinder lever being operably coupled to a key cylinder via a rod, the key cylinder lever having a tab portion that is received in a receiving area of the lock link lever such that actuation of the key cylinder lever from a first position to a second position will cause the tab portion to contact a wall of the receiving area which causes movement of the lock link lever a locked position to an unlocked position, the key cylinder lever allows for manual unlocking of the vehicle latch; and pivotally mounting an emergency lock lever to the vehicle latch, the emergency lock lever being accessible from an exterior of the vehicle latch, the emergency lock lever when actuated will transition the vehicle latch from an unlocked state to a locked state.

BRIEF DESCRIPTION OF THE DRAWINGS

The following descriptions should not be considered limiting in any way. With reference to the accompanying drawings, like elements are numbered alike:

FIG. 2D is an exploded view of the reset lever and the power release gear;

FIG 2D' is a cross-sectional view of the reset lever and the power release gear;

DETAILED DESCRIPTION

Figure 1:
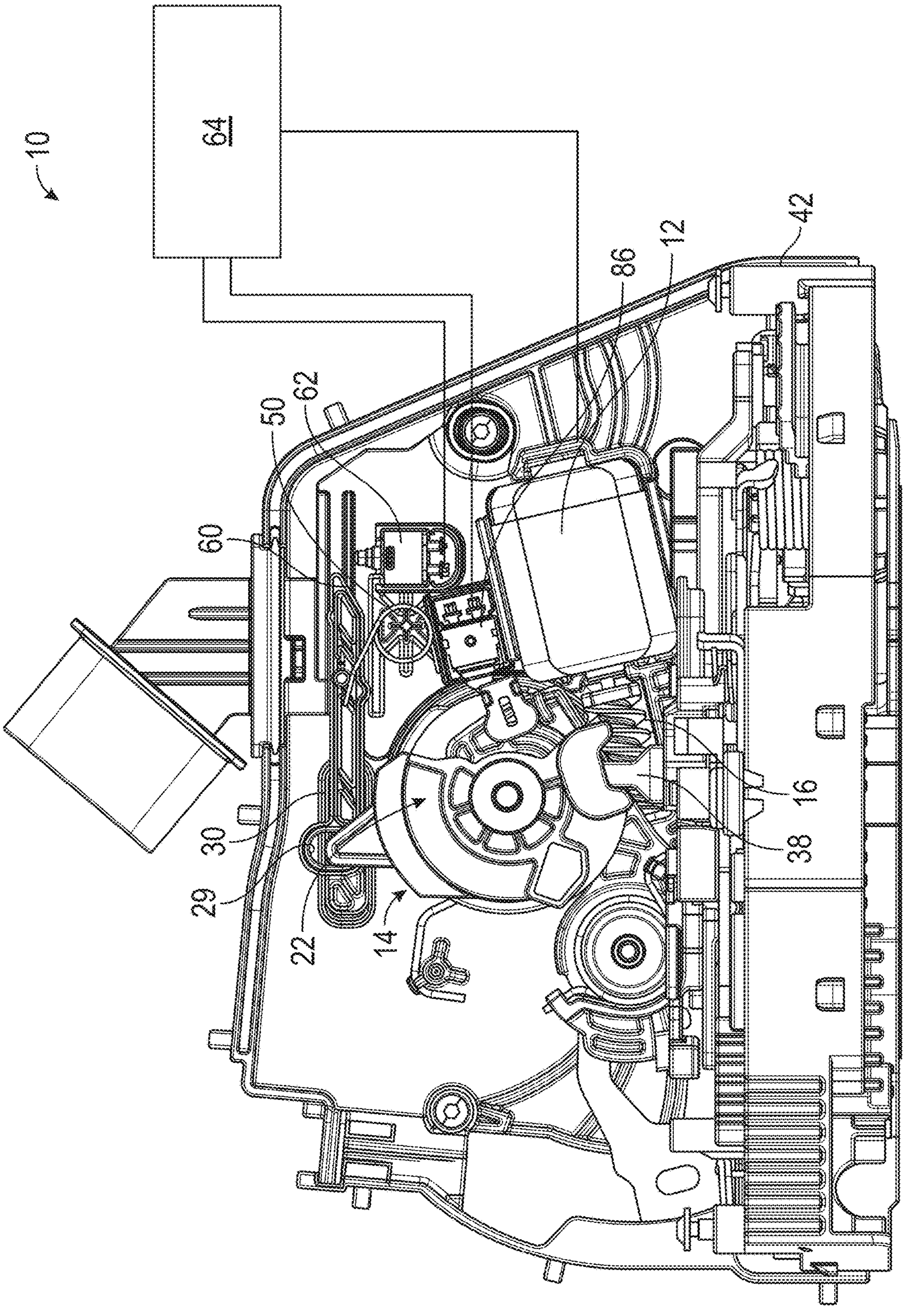
FIG. 1 illustrates a portion of a vehicle latch with a gear lock lever in a home position in accordance with the present disclosure.
Figure 1A:
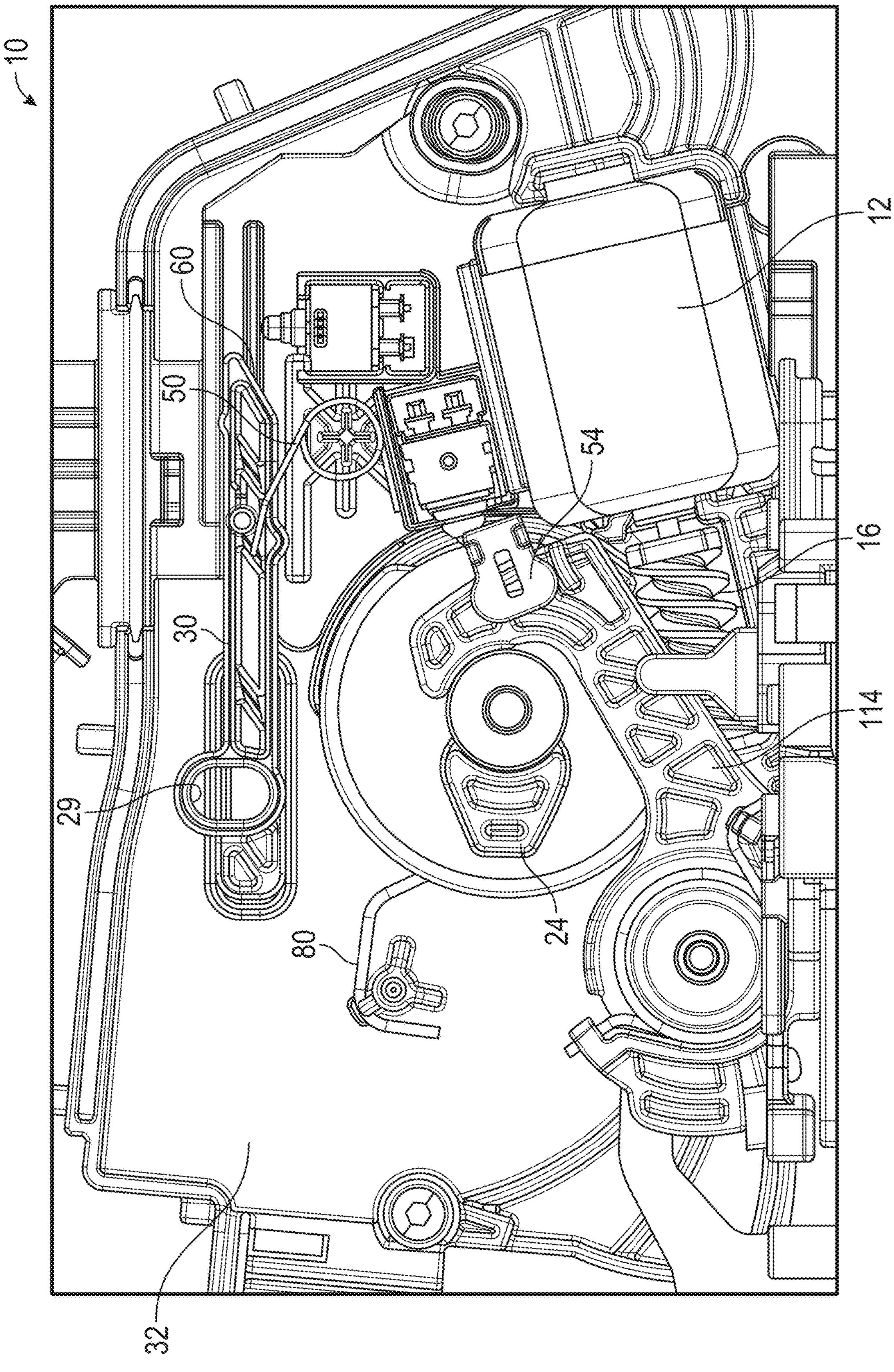
FIG. 1A illustrates a portion of the vehicle latch with the gear lock lever removed in accordance with the present disclosure.
Figure 2:
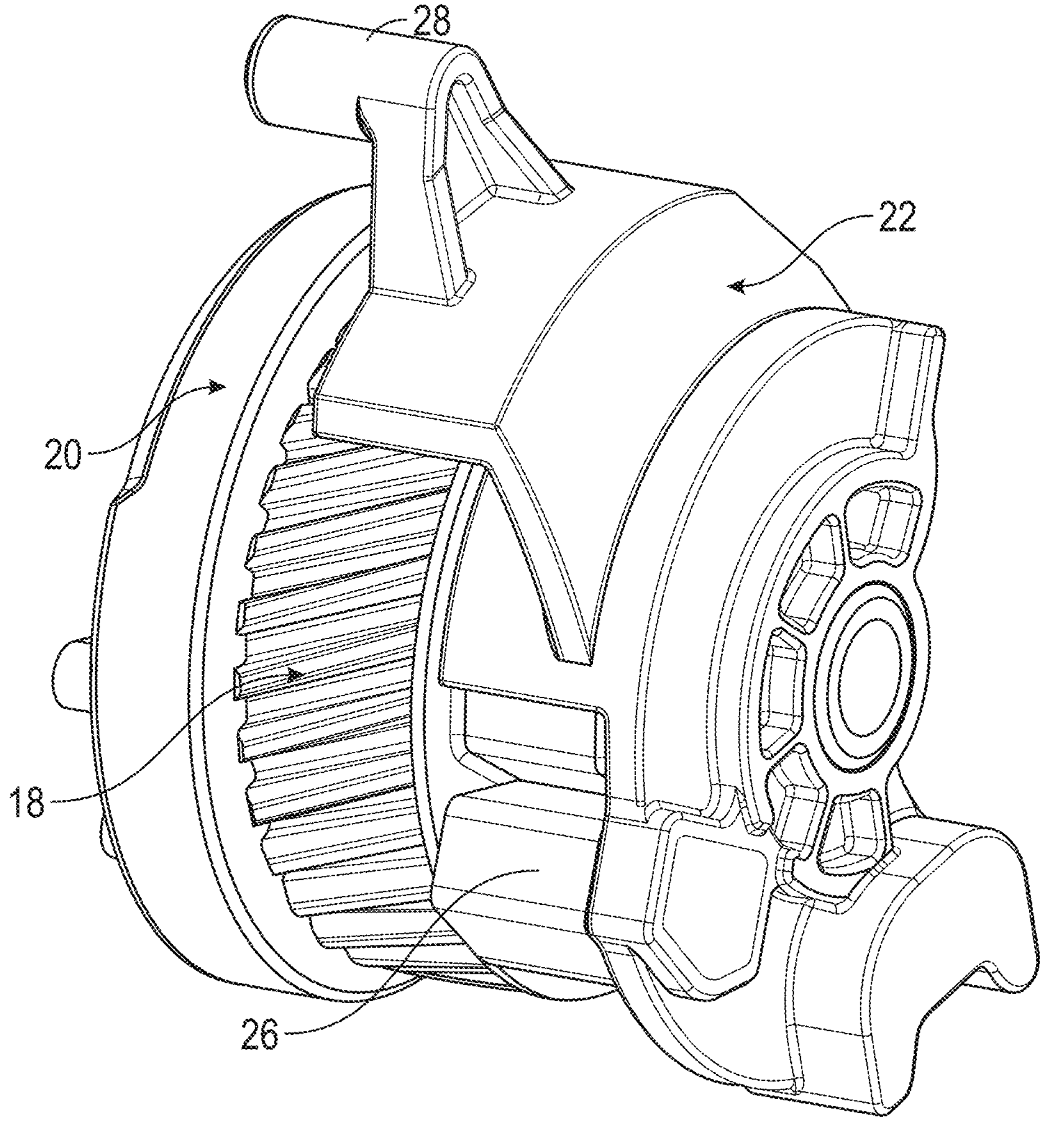
FIG. 2 is a perspective view of the gear lock lever, a power release gear, and a reset lever of the vehicle latch of the present disclosure.
Figure 2A:
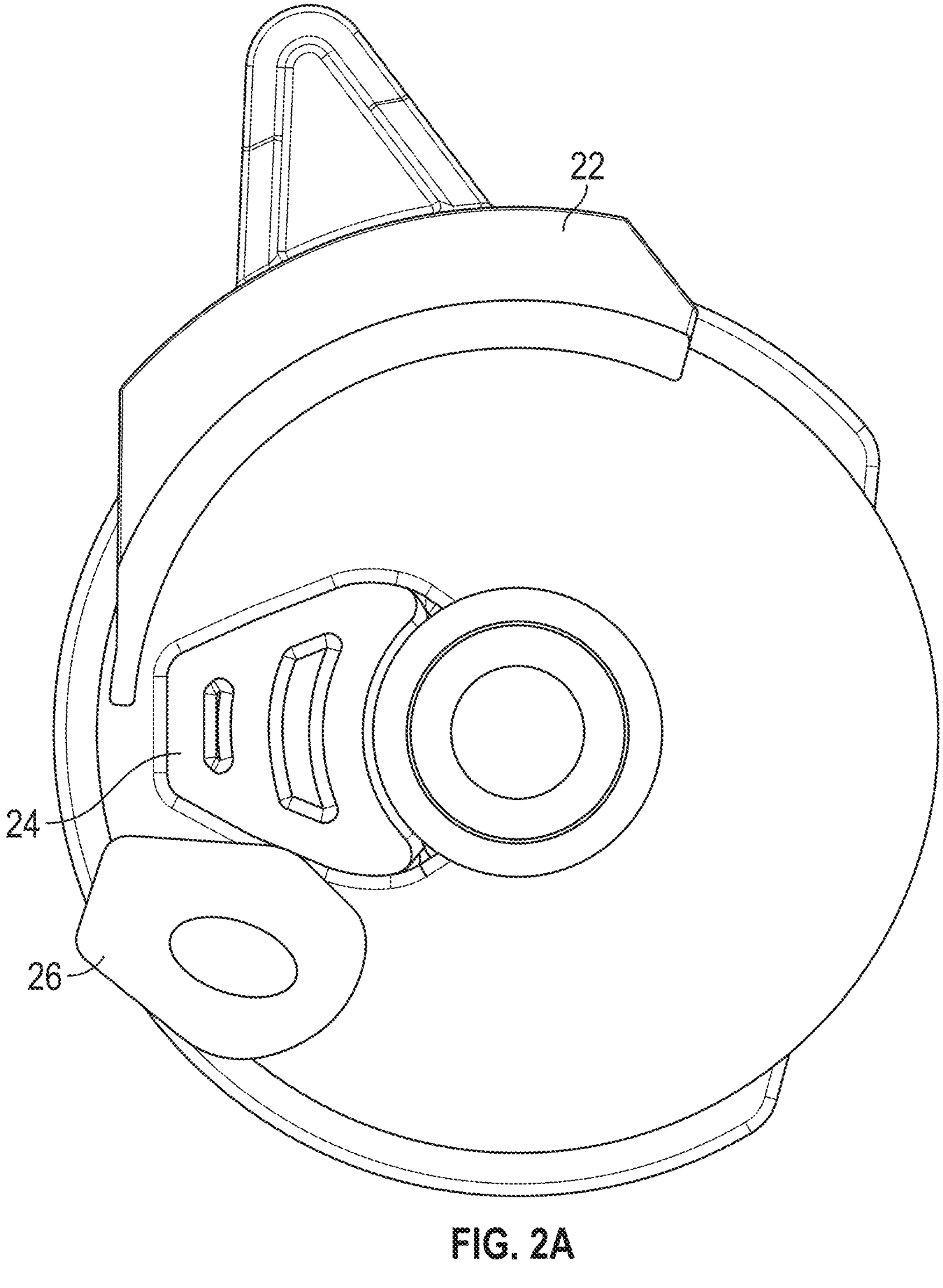
FIG. 2A is a partial sectional view of the gear lock lever.
Figure 2C:
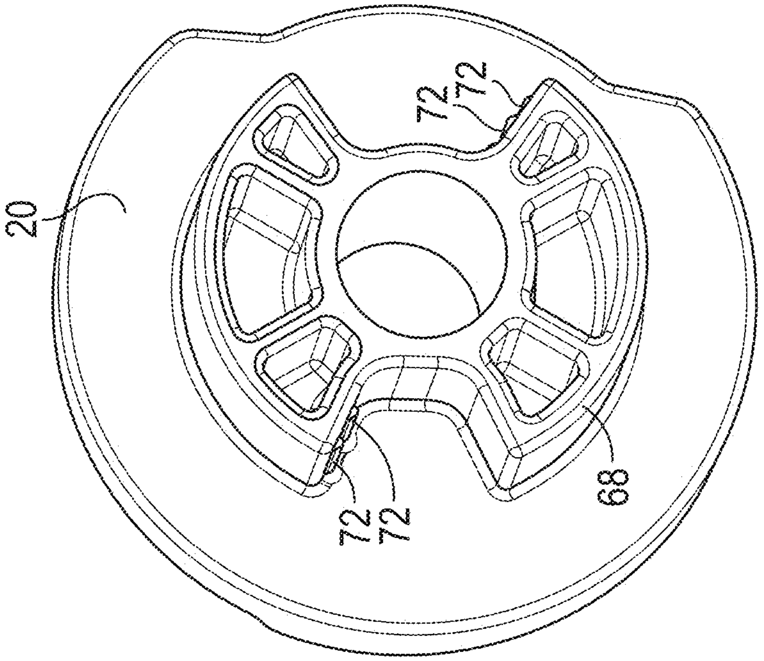
FIG. 2C is a perspective view of the reset lever.
Figure 2B:
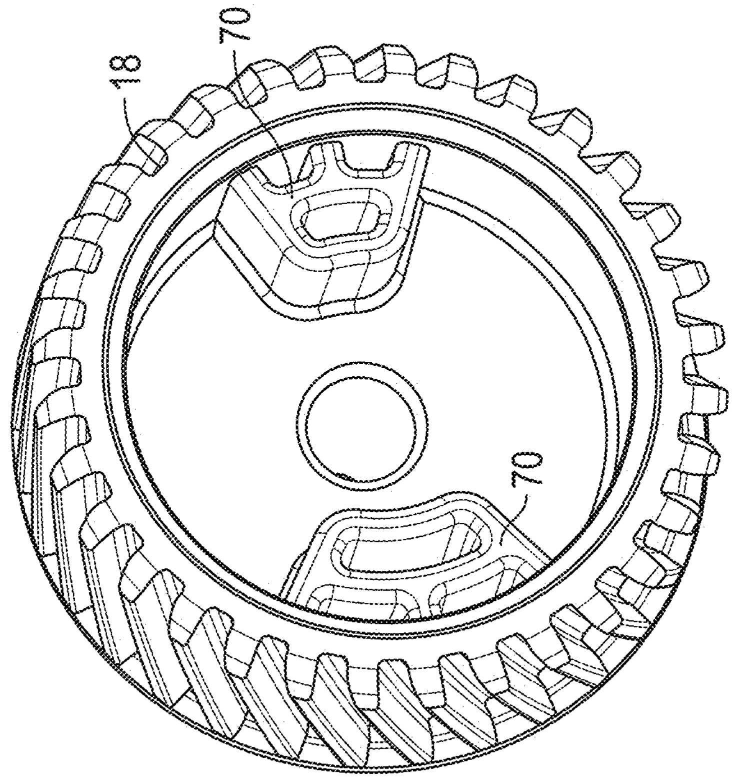
FIG. 2B is a perspective view of the power release gear.
Figure 2E:
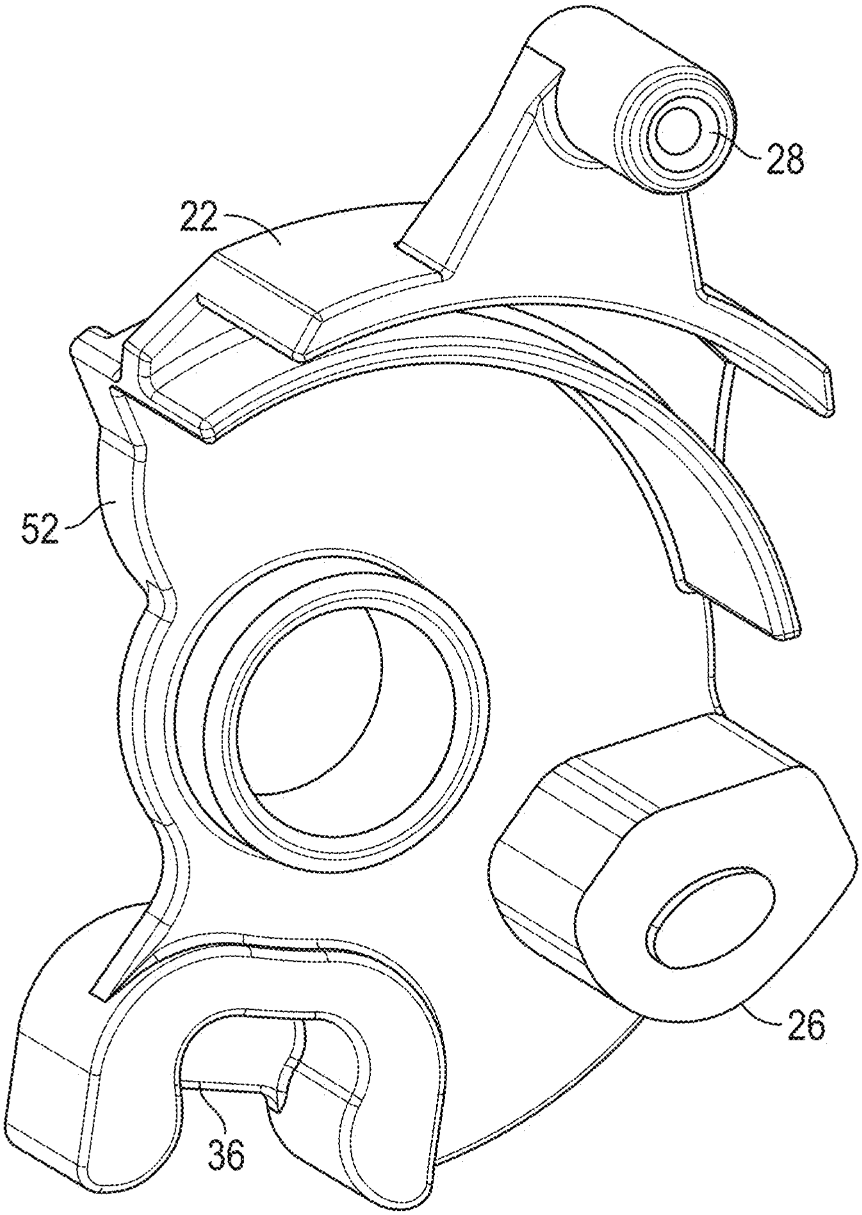
FIG. 2E is a rear perspective view of the gear lock lever of the present disclosure.
Figure 2F:
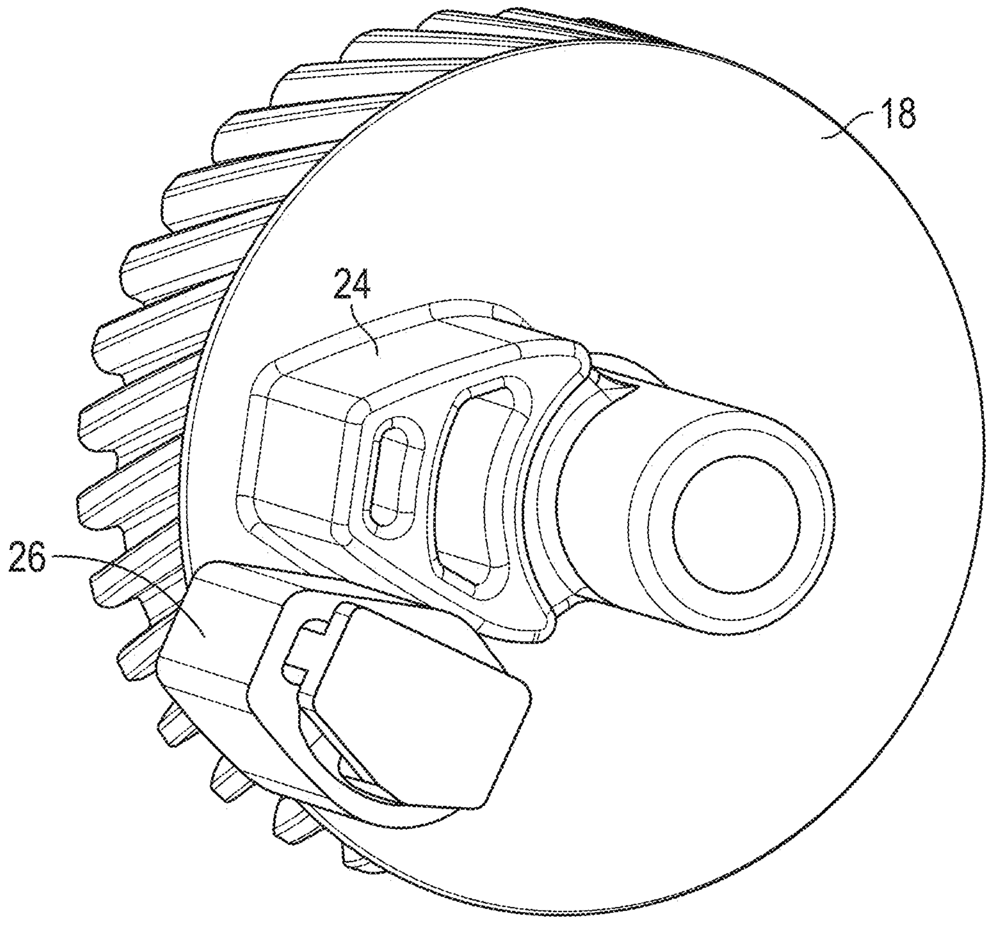
FIG. 2F is perspective view illustrating interaction of the overmolded bumper of the gear lock lever interacting with the power release gear in accordance with the present disclosure.
Figure 3:
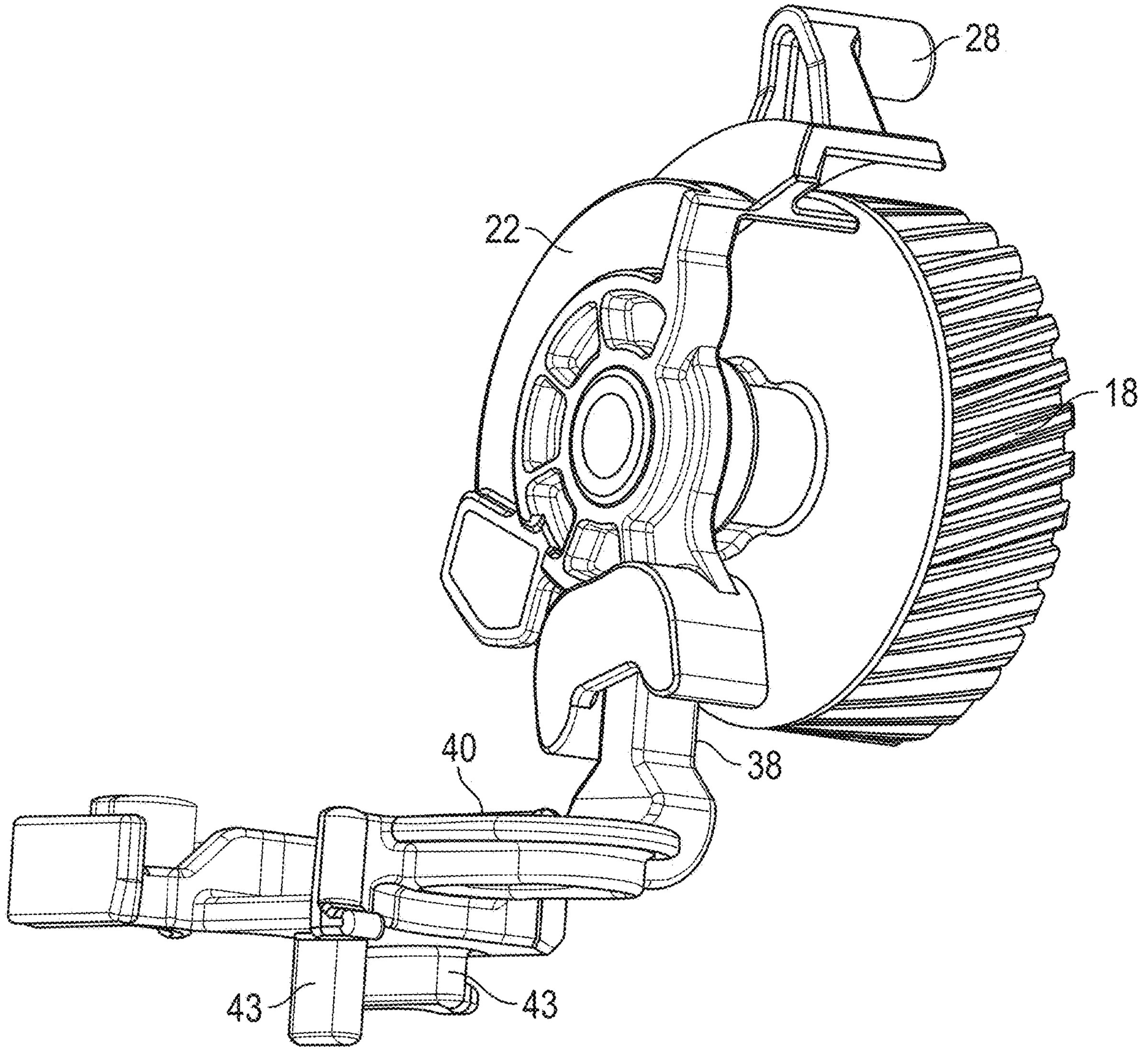
FIG. 3 is a perspective view of the gear lock lever, a lock link and the power release gear of the latch of the present disclosure.

A detailed description of one or more embodiments of the disclosed apparatus and method are presented herein by way of exemplification and not limitation with reference to the Figures.

The single-motor concept offers the capability of performing several latch functions electrically. Through only one motor, the latch will be capable of power releasing, back driving, locking, and unlocking. In the present disclosure, the lock/unlock functions are newly introduced and work by enabling/disabling the outside release lever pivoting on a latch housing to allow the user the freedom and security of ensuring that the side door of the vehicle will be closed or opened from the outside only when intended.

The home position for the proposed mechanism is also known as the locked state. In this state, the power release gear is in the fully back drive direction and contacts an over-molded bumper (as used herein and throughout this application and in one non-limiting embodiment bumper may refer to an elastomeric material capable of being deflected and absorbing impacts, one non-limiting material contemplated for bumpers is rubber or rubber-like polymers or equivalents thereof) located in the gear lock lever, ensuring that the latter maintains its position without any movement (this is also because of the dynamic brake in the power release motor). The gear lock lever pivoting on the power release gear will have a u-shape type of feature at its bottom that will allow the connection between this lever and the lock link. Consequently, the lock link will also have a counterpart geometry to allow the interaction between the gear lock lever and the lock link, which will cause that whenever the gear lock lever moves into the unlock or lock direction, the lock link will move too. The lock link will have a spring installed on the latch housing and sitting on the backplate, causing the mechanism to move into the unlock direction whenever the power release gear moves into the power release direction or unlock direction. The lock link will rest in a backplate and will have 2 guide features that slide though 2 slots in the backplate to ensure the lever's stability when its traveling to the lock or unlock position. When the gear lock moves into the unlocked position, a bumper installed in the cover will dampen and stop its rotation at 35 degrees of movement. Within the lock link geometry, there will be an "impatient passenger" spring; this spring will always have a torque applied to the bypass lever in case there is an impatient passenger scenario; this scenario is whenever the vehicle user pulls the outside release handle first before the unlock operation. The impatient passenger spring will allow the bypass lever to move into the unlock direction whenever the outside release lever goes back to its home position, preventing any jamming condition within the release mechanism. The bypass lever will pivot and travel along a channel feature located in the lock link. The bypass lever will also have a tab feature that will travel along a channel of a pawl release lever. The outside release lever pivoting in the latch housing will contact this tab, enabling the movement of the pawl release lever, thus, the movement of the pawl lifter and the pawl, releasing the claw, causing it to open the latch. Whenever the single motor latch is in the lock state, the tab feature in the bypass lever will move to disable the possibility of releasing the latch via the outside release lever.

In addition, a switch link lever will be coupled to the gear lock lever, so that whenever the gear lock lever rotates into the unlock direction, the switch link will travel along a channel located in the electronic component carrier (ECC), enabling the activation of the lock switch. This switch will serve as a redundancy switch (redundancy with the gear lock switch), to ensure that the lock/unlock activation can always be detected in case there is a switch failure in any of the switches. Because the unlock state happens at approximately 35 degrees of rotation, the mechanism must be capable of stopping the gear at a precise moment to avoid any over-travel and mitigate the risk of unintendedly power releasing the latch. To achieve a precise stop in the lock/unlock mechanism, a reset lever coupled to the gear will have a cam surface that will contact a switch, called the gear lock switch. This switch will be activated precisely at 35 degrees of rotation and will send a signal to the vehicle's DCU to stop the motor and consequently the worm and gear. In addition to the switch activation, the reset lever coupled to the gear, will have integrated a "U" feature that will interact directly with the inside release lever spring; when the mechanism is about to reach the 35 degrees of rotation, this "U" feature will get trapped between its counterpart located in the spring. This feature located in the reset lever, will help to reassure that the mechanism stops at the desire moment. In addition to that, the reset lever will have installed a power release bumper to dampen the sound and impact load whenever the latch goes to the power release direction or back drive direction. Also and instead of using a pin to pivot the power release gear, a new semi-tubular pivot is being introduced, this is with the purpose of better handling the stability of the power release mechanism and lock mechanism as it helps to have a better stack up between all of the components and also, improve the deformation between these because of the thrust load of the motor.

In an event of power loss at the vehicle, the latch shall be capable of locking or unlocking through a mechanical or manual mode. To make this possible, a key cylinder lever pivoting in the latch housing, will serve to manually unlock the latch. The key cylinder lever will have a tab that will interact directly with the lock link so that whenever the key cylinder lever is rotated into the unlock position, this tab will push the lock link into this direction, consequently translating the bypass lever to make possible the manual release of the latch via the outside handle. Because the lock link is directly linked to the gear lock, the gear lock will move to the unlock state, and consequently the power release gear thanks to the overmolded bumper located in the gear lock. As mentioned before, the reset lever is married to the power release gear and will move whenever the latter moves. After performing the manual unlock via the key cylinder, the U shape feature located in the reset lever, will also get trapped into its counterpart in the inside release lever spring, this to ensure the position of the manual unlock.

Now, to lock the vehicle in case of power loss, an emergency lock lever pivoting in the latch housing, will have a key entry feature at its bottom (on the side of the frame) to ensure the vehicle user can insert a key to manually lock the latch. Whenever the user rotates the emergency lock lever into the lock position, the latter will translate the lock link into the lock position thanks to a post that will interact with this link. Consequently, the bypass lever will translate also to the lock position disabling the capability of manual releasing the latch via the outside release lever. To ensure that the emergency lock lever maintains its position, an overcenter spring installed into the latch housing and assembled in the emergency lock lever will ensure that either the lock or unlock state is achieved and maintained.

A side door latch is provided that can electrically lock/unlock, power cinch and power release the vehicle. It also offers mechanical functions, such as manual release, through both inside and outside, as well as key unlocking and emergency locking in case of a battery loss.

The electrical functions are sure to provide the final user a comfortable experience which allows them to interact with the vehicle door in a luxurious way. While the mechanical functions ensure that the user will still have a means to lock/unlock and open the side door.

The cinching mechanism offered by this latch works through a remote cinch actuator that is connected by a cable to the mechanism within the latch. The remote cinch actuator contains a motor that will send a pulse and consequently move a gear train. The gear driven is coupled to a cable lever which pulls the cinching cable, thus moving the cinching lever within the latch to allow the door to move from secondary position to primary closed position. The cinching mechanism also includes the means to override the function if necessary. This works through an interaction between an override link which pulls an override clutch lever, which in turn moves the override lever to allow the cinch link to bypass the claw.

The electrical functions within the latch work through a single motor which allows to power release and lock/unlock. There are some geometrical modifications that were made to accommodate this new and improved latch design. This is also the case for the outside release mechanism and the pawl release lever which is used for all the releases of the latch. The concept remains the same, but the geometry was enhanced to improve the functionality of these components into the new design.

The power release mechanism also has changes to accommodate the new mechanisms. A key element of this new latch is that it can perform the power release/back drive and lock/unlock functions through a single motor. This mechanism allows the final user to power lock/unlock the vehicle door from the outside, providing more security to the vehicle. This system consists of a gear lock lever that interacts with a lock link to enable/disable the outside release lever.

In addition, the latch also contains the ability to mechanically lock/unlock the latch in a battery loss event. locking of the latch is achieved through an emergency lock lever and an over center spring that serve to enable the outside lever. Mechanically unlocking of the latch is achieved through a key cylinder lever that is assembled on the latch housing and directly interact with the lock link. A bypass lever is assembled on the latter and travels through the slot of the pawl release lever to enable the outside lever. In addition, this mechanism also contains an impatient passenger spring, so that if the final users pull on the handle while on the lock state, the vehicle door won't be opened. However, if during this interaction, the latch state changes to unlock, it will force the user to let go of the handle and pull it once again to open the vehicle door.

Referring now to the FIGS., a vehicle latch 10 in accordance with the present disclosure is illustrated. As mentioned above, a single motor 12 is used to perform several latch functions electrically. Through only the single motor 12, the vehicle latch 10 will be capable of power releasing, back driving, locking, and unlocking. In other words, the vehicle latch 10 will only have one or a single motor 12.

Figure 4:
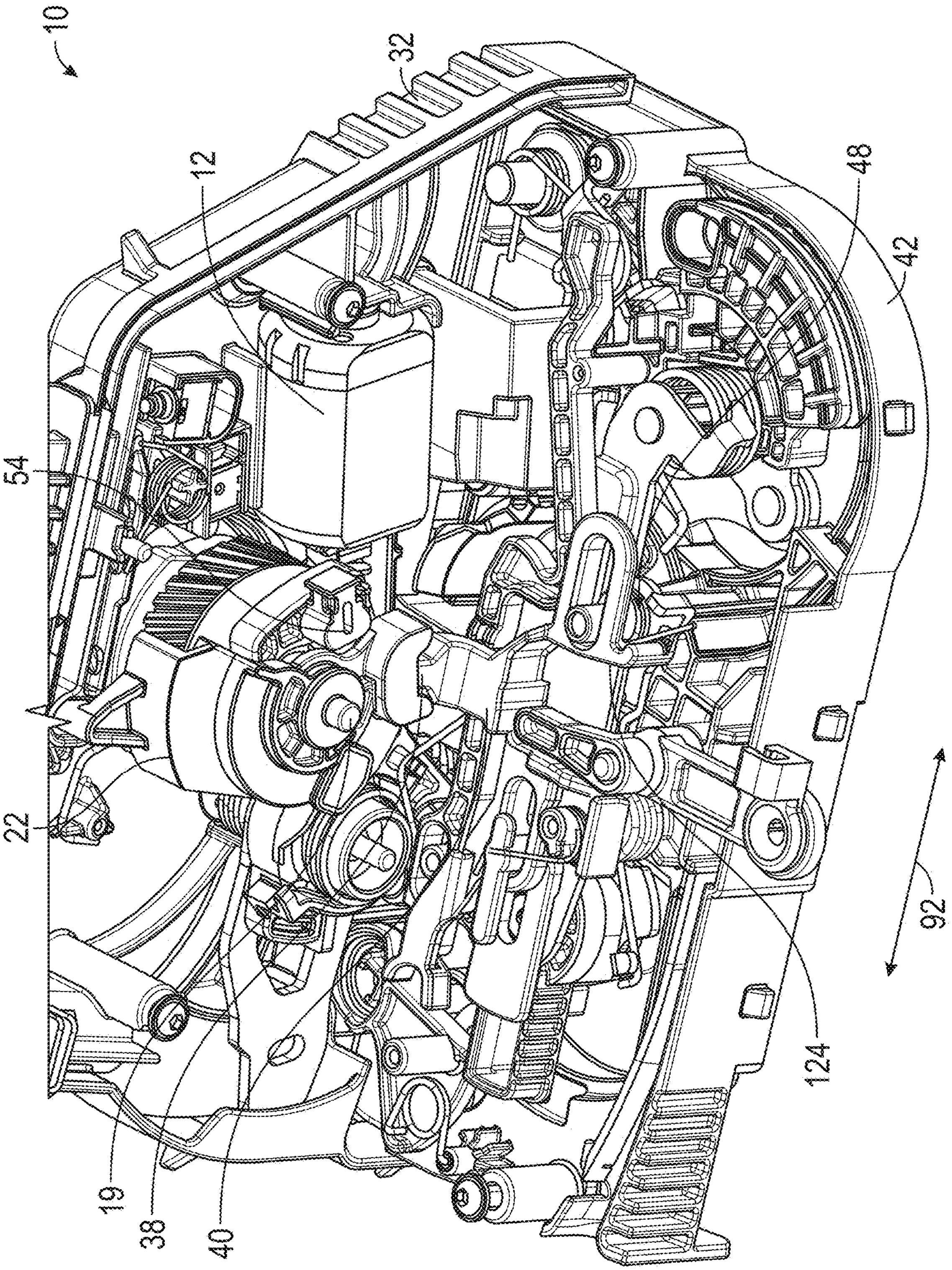
FIG. 4 is a perspective view a portion of the vehicle latch in accordance with the present disclosure.
Figure 5:
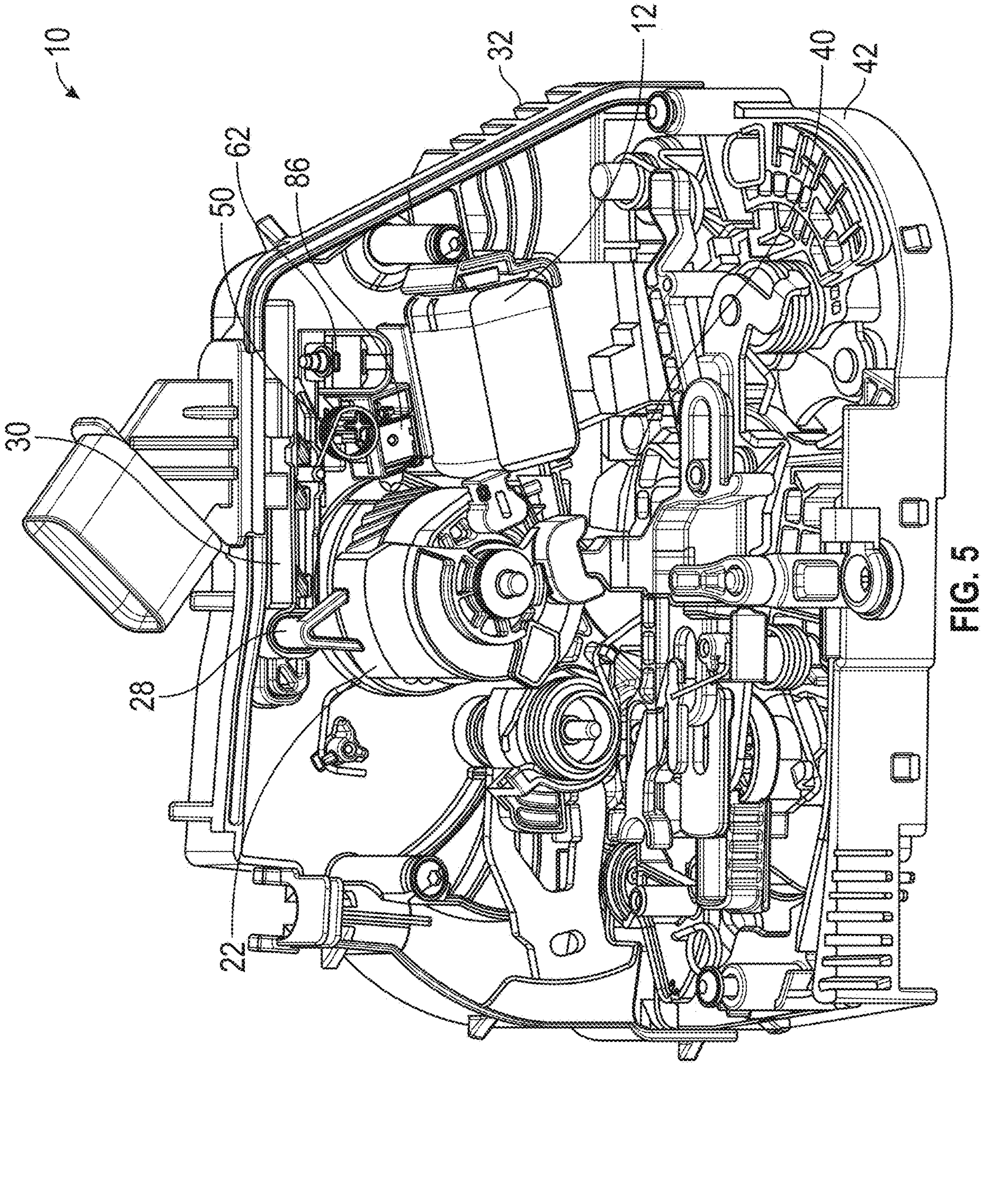
FIG. 5 is a perspective view of the vehicle latch in a lock position in accordance with the present disclosure.

The single motor 12 is operably coupled to a drive assembly 14 via a worm 16 secured to a shaft of the single motor 12. The drive assembly 14 may also be referred to as a lock mechanism and a power release mechanism. The drive assembly includes a power release gear 18, a reset lever 20 secured to one side of the power release gear 18 and a gear lock lever 22 located on an opposite side of the power release gear 18. The gear lock lever 22 is capable of independent movement with respect to the power release gear 18 and the reset lever. A surface of the power release gear 18 is configured to have a cam feature 24 that engages a bumper 26 of the gear lock lever 22 when the drive assembly 14 of the latch 10 is in a locked position where the gear lock lever 22 is in a home position. This position is illustrated in at least FIGS. 1, 4 and 5.

Also and instead of using a pin to pivot the power release gear 18, a semi-tubular pivot 19 is used, this is with the purpose of better handling the stability of the power release mechanism and lock mechanism as it helps to have a better stack up between all of the components and also, improve the deformation between these because of the thrust load of the motor 12.

The gear lock lever 22 has an upper tab member 28 operably coupled to a switch link 30 that is movably or slidably mounted to an actuator housing 32 of the vehicle latch 10. The upper tab member 28 is received within an opening 29 of the switch link 30. The gear lock lever 22 also has a lower portion 34 that has a "U" shaped receiving area 36 operably coupled to a tab 38 of a lock link lever 40 movably mounted to a housing portion 42 of the vehicle latch 10. In one embodiment, the actuator housing 32 and the housing portion 42 of the vehicle latch 10 are separate components secured to each other or the actuator housing 32 and the housing portion 42 are integrally formed together as a single integral latch housing portion.

Movement of the lock link lever 40 from a first or locked position to a second or unlocked position will allow the vehicle latch 10 to be opened by an outside release lever 44 pivotally or moveably mounted to the housing portion 42. The outside release lever 44 being operably coupled to a handle 46 (illustrated schematically) located on an exterior of a vehicle the vehicle latch 10 is secured to. The outside release lever 44 being operably coupled to the handle 46 via a cable 47 or any other equivalent device.

The lock link lever 40 will rest in a backplate 41 and will have two guide features 43 that slide though two slots 45 in the backplate 41 to ensure that the lock link lever's stability when its traveling to between the lock or unlock positions.

Figure 6:
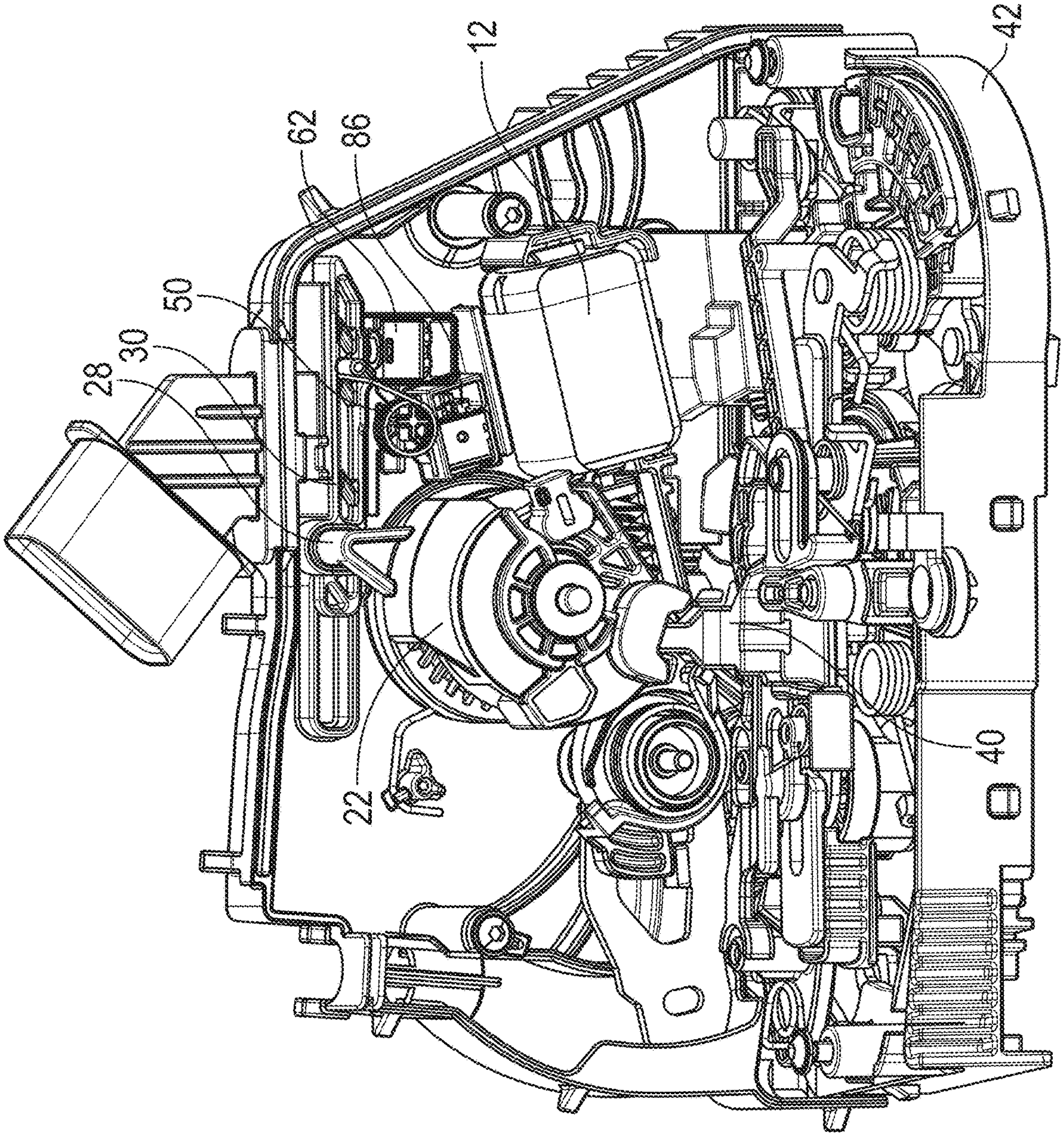
FIG. 6 is a perspective view of the vehicle latch in an unlock position in accordance with the present disclosure.
Figure 7:
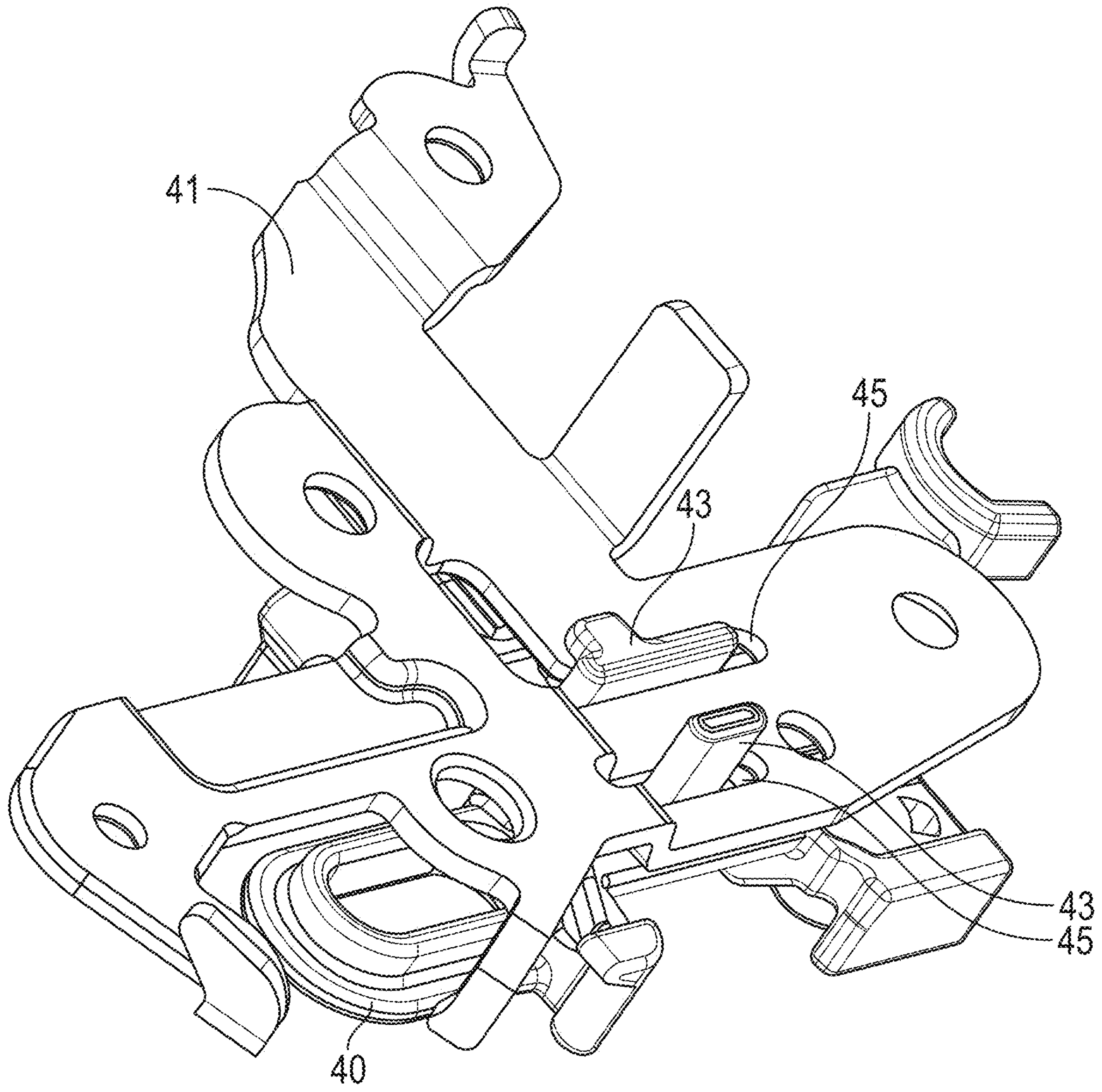
FIG. 7 is a perspective view of components of the vehicle latch in accordance with the present disclosure.
Figure 9:
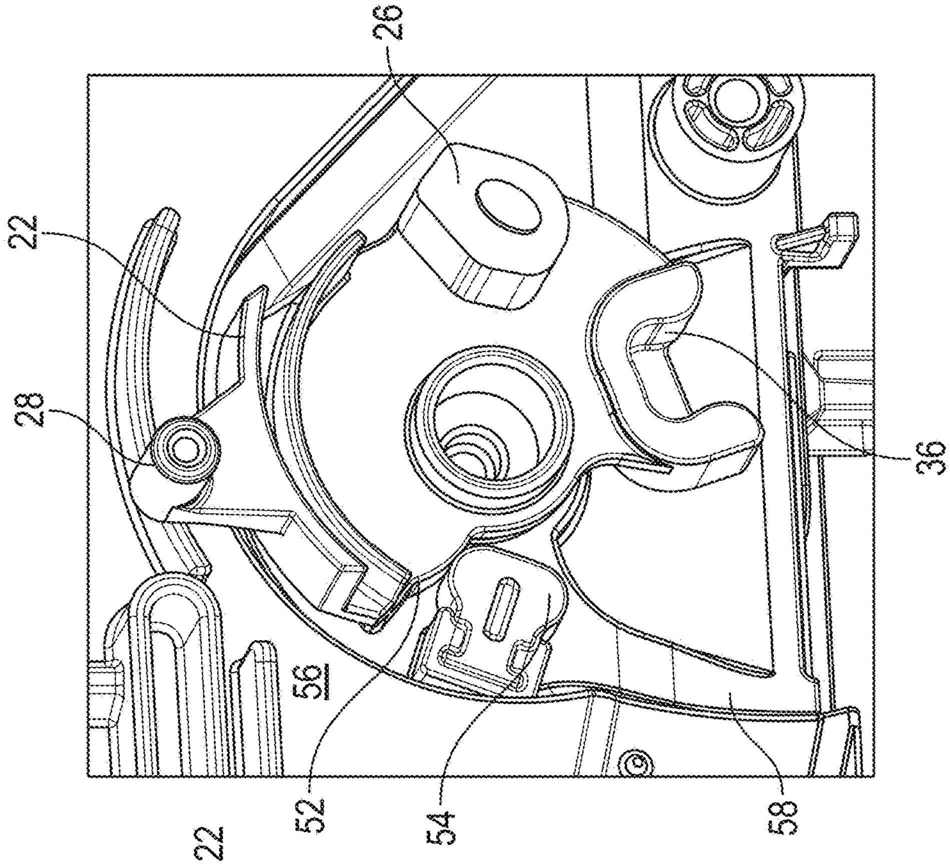
FIG. 9 is a perspective view of the gear lock lever in an unlock position in accordance with the present disclosure.
Figure 8:
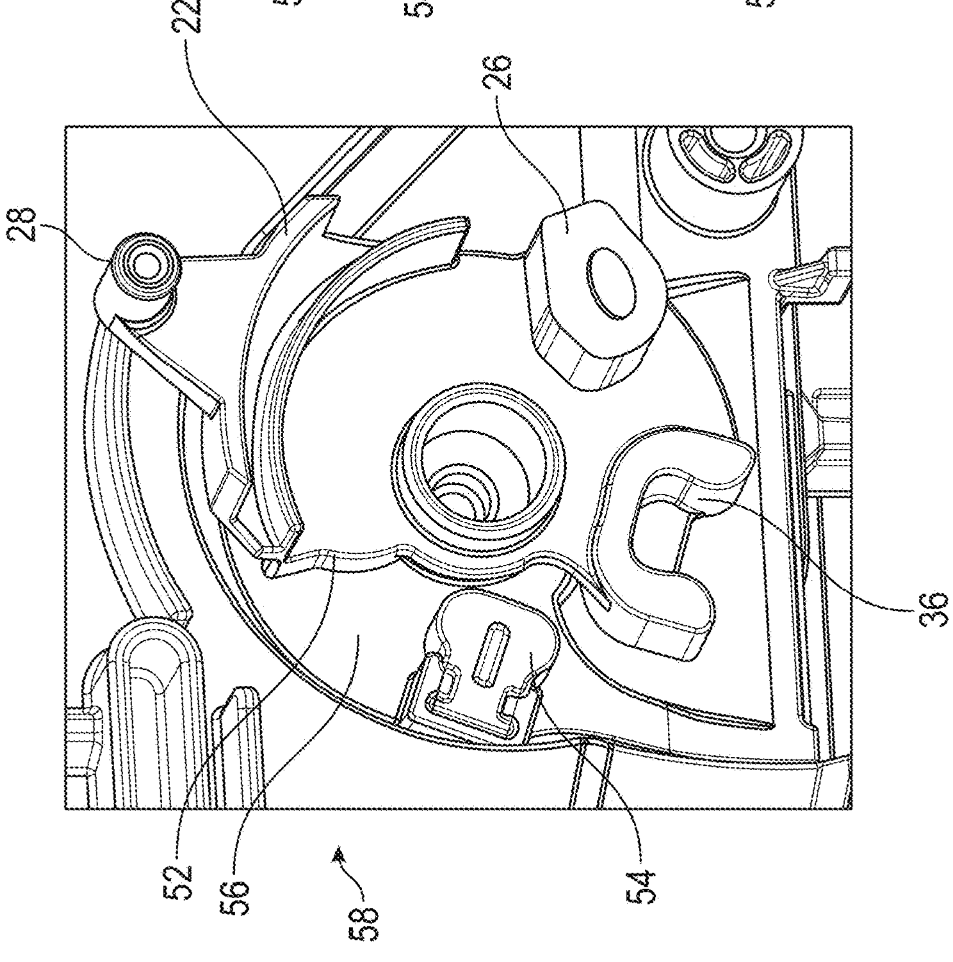
FIG. 8 is a perspective view of the gear lock lever in a lock position in accordance with the present disclosure.

When power release gear 18 is in a first or home position, the cam feature 24 of the power release gear 18 contacts bumper 26 of the gear lock lever 22 which maintains the gear lock lever in the first or home position, which corresponds to the lock position of the vehicle latch 10. In order to transition the vehicle latch 10 to the unlock position the single motor 12 is energized and the worm 16 is rotated and the power release gear 18 is rotated in a clockwise direction with respect to the views illustrated in at least FIGS. 1, 2A, 4 and 5. This movement causes, the cam feature 24 to no longer contact bumper 26 of the gear lock lever 22. The gear lock lever 22 is spring biased into a second or unlock position by a lock link spring 48 secured to the vehicle latch. The lock link spring 48 provides a biasing force to the lock link lever 40. A switch link spring 50 secured to the vehicle latch provides a biasing force to the switch link 30. In one non-limiting embodiment, the switch link spring 50 is secured to the latch cover 58 of the vehicle latch. The lock link spring 48 and the switch link spring 50 will cause the gear lock lever 22 to rotate in the clockwise direction with respect to the views illustrated in at least FIGS. 1, 2A, 4, 5 and 8 from the first or home position (locked position) to the second or unlocked position, see at least FIGS. 6, 9.

When the power release gear 18 is rotated such that the cam feature 24 no longer contacts bumper 26, the springs 48 and 50 cause movement of the switch link 30 and lock link lever 40 which will cause rotation of the gear lock lever 22 as it is operably coupled to switch link 30 and the lock link lever 40. For example, upper tab member 28 engages the switch link 30 and the tab 38 of the lock link lever 40 is received in the receiving area 36 of the gear lock lever 22.

The second or unlock position of the gear lock lever 22 is defined when a portion 52 of the gear lock lever 22 contacts a bumper 54 that is secured to an inner surface 56 of a latch cover 58 that is configured to be secured to the actuator housing 32.

As previously mentioned, a reset lever 20 is secured to the power release gear. The reset lever 20 has a cam feature 68 that is configured to engage complimentary cam features 70 of the power release gear 18 such that the reset lever 20 can be secured to the power release gear 18. The cam feature 68 of the reset lever 20 has crush ribs 72 that allow the reset lever to be interference fit or snap fit into the power release gear 18.

Figure 19:
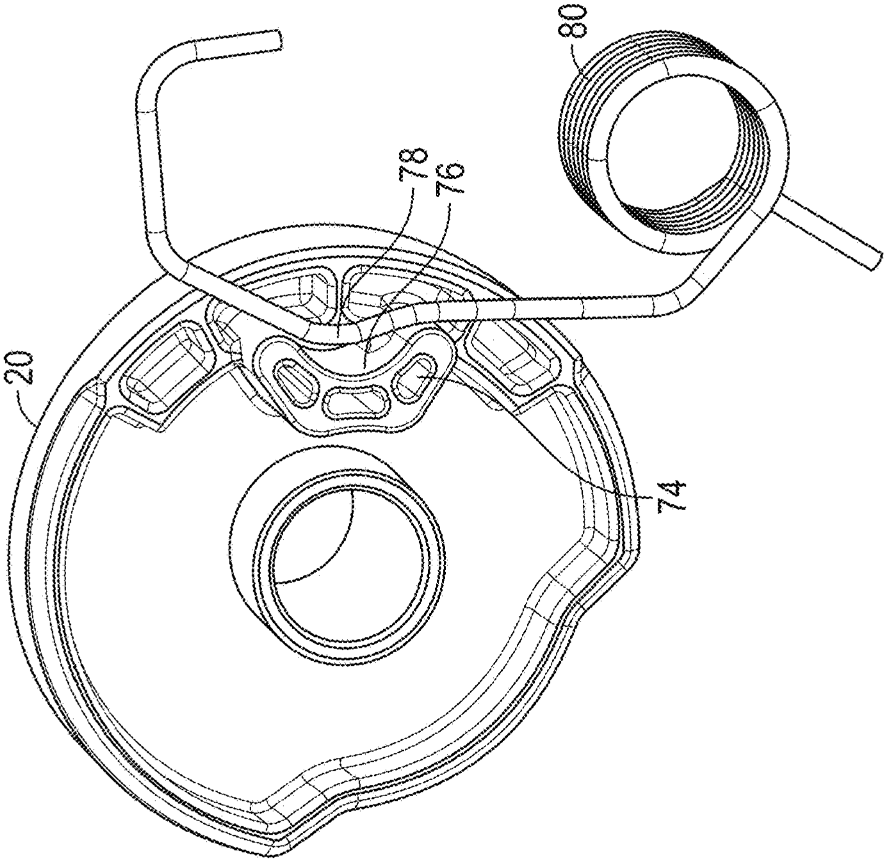
FIGS. 18 and 19 are views of illustrating movement the reset lever.
Figure 18:
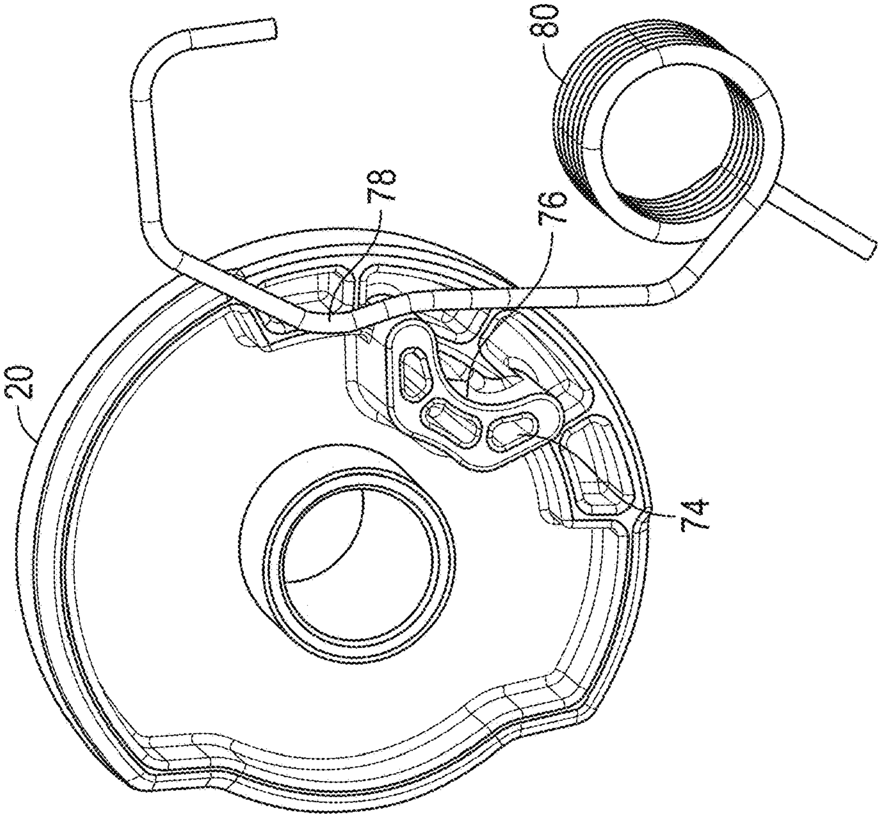
Figure 20:
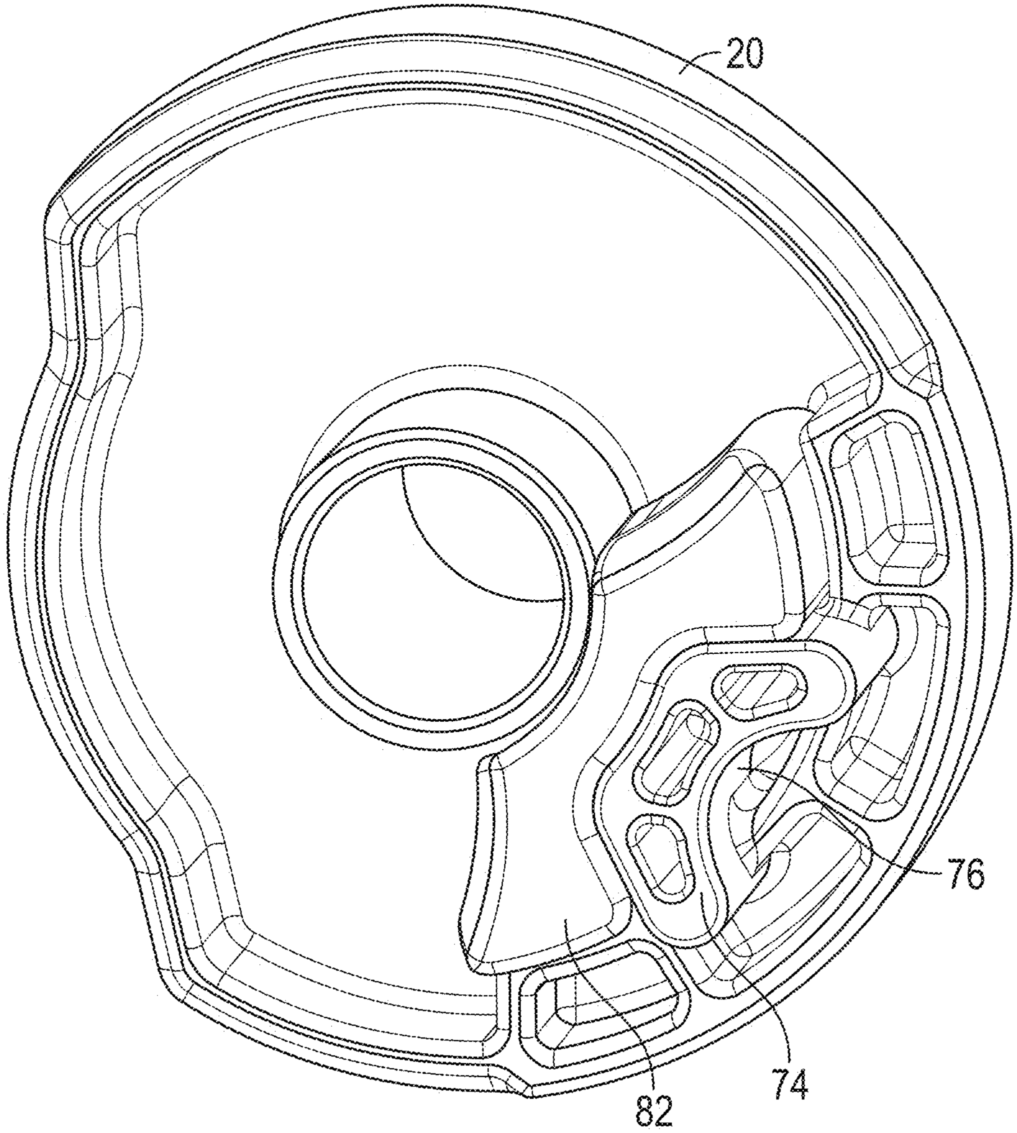
FIG. 20 is a perspective view of the reset lever.
Figure 21:
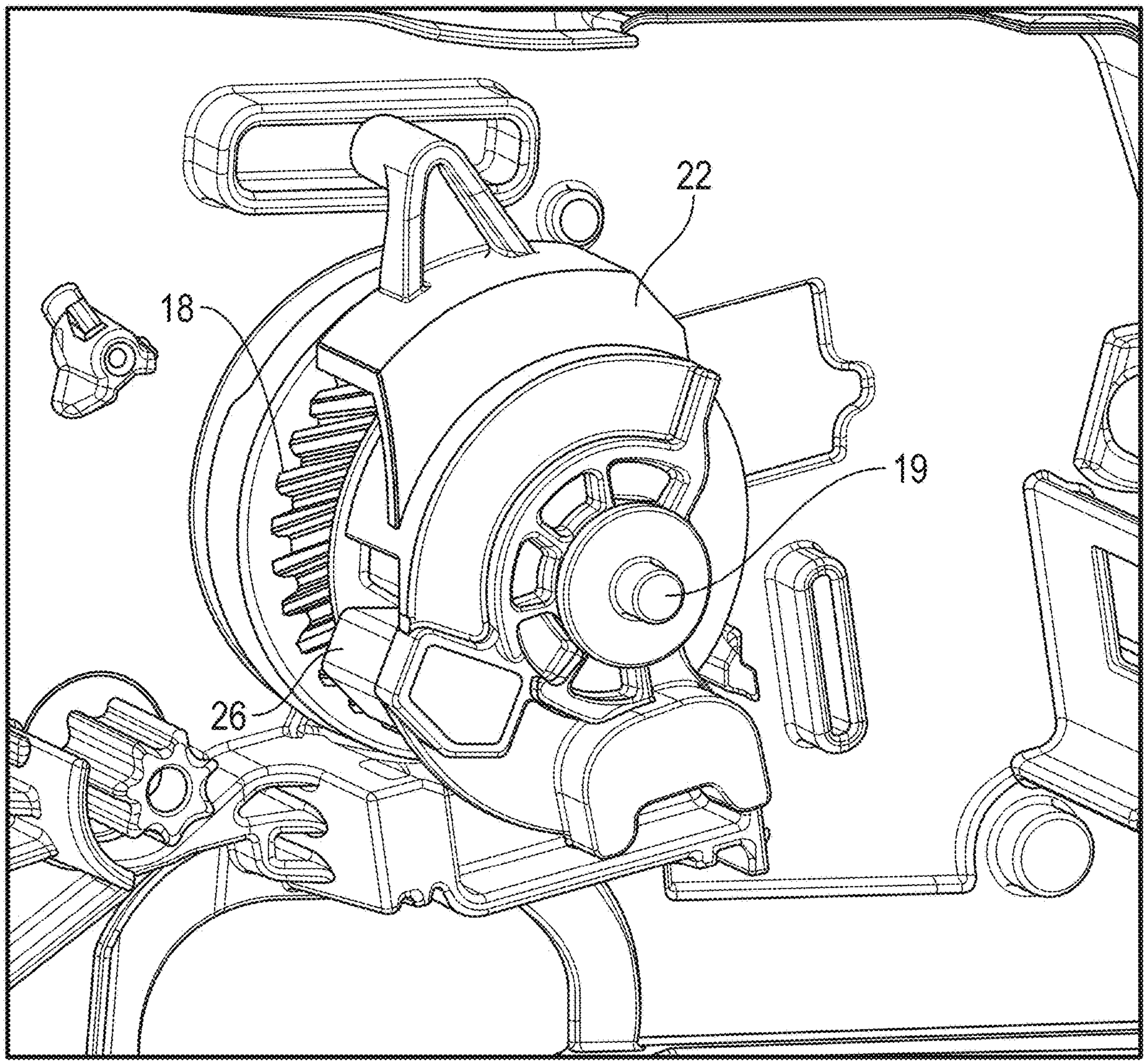
FIG. 21 is a perspective view of portions of the vehicle latch.

On an opposite side of the reset lever 20 a cam feature 74 is provided. Cam feature 74 is provided on an opposite side to that of the cam feature 68. Cam feature 74 defines a recessed area 76 that receives a bump portion 78 of a spring 80 secured to the vehicle latch. In one non-limiting embodiment, the spring 80 is secured to the of the actuator housing 32. This bump portion 78 engages recessed area 76 when the reset lever 20 is rotated into the unlock position. See at least FIGS. 18 and 19.

Figure 16:
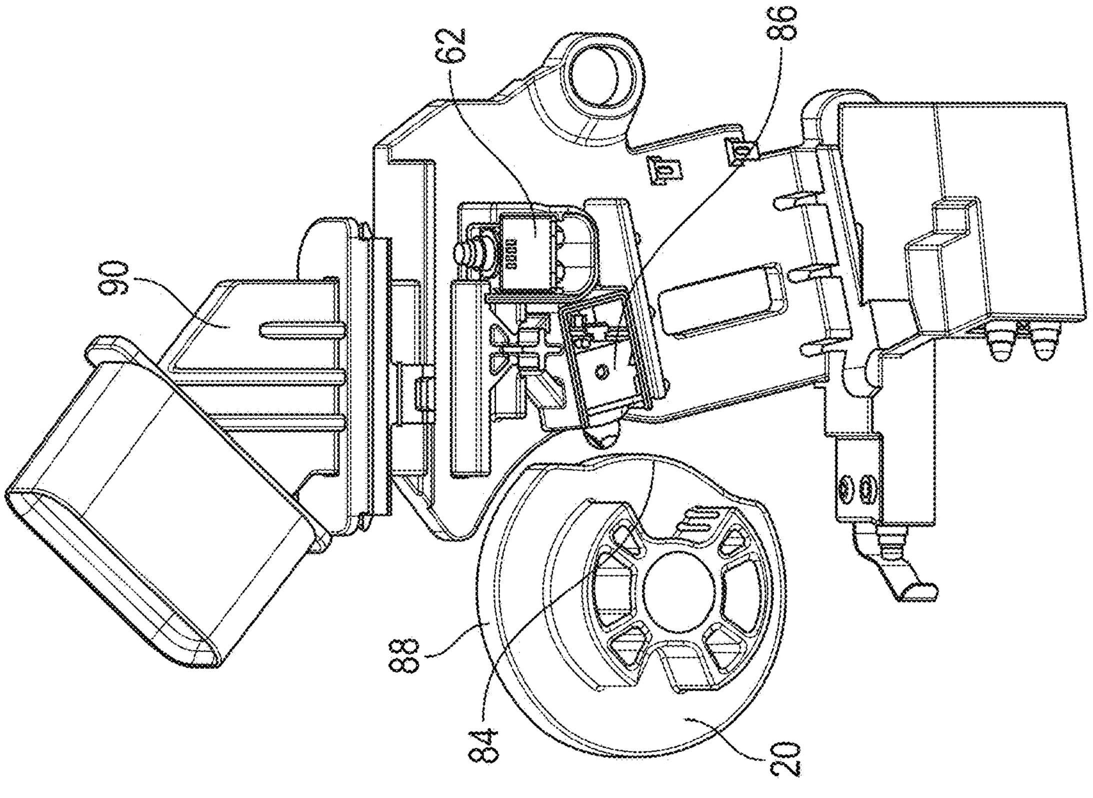

The reset lever 20 has a recessed periphery 84 that does not contact a primary switch 86 when the reset lever 20 is in the locked position (see at least FIG. 16) and an outer periphery 88 of the reset lever 20 contacts the primary switch 86 when the reset lever 20 is in the unlocked position. Primary switch 86 is operably coupled to a controller 64. Actuation of the primary switch 86 by the outer periphery 88 of the reset lever 20 will send a signal to the controller 64 that causes the single motor 12 to cease operation and indicate to the controller 64 that the vehicle latch 10 is in an unlocked state.

The movement of the gear lock lever 22 also causes movement of switch link 30. The switch link 30 has a cam surface 60 that actuates a secondary switch 62 when the gear lock lever 22 is in the unlock position. The secondary switch is serves as a back up to the primary switch 86 in the event of a failure of the primary switch 86. In one embodiment, the switches 62 and 86 are secured to an electronic circuit carrier 90.

As mentioned above and during power unlock, which happens at approximately 35 degrees of rotation of the gear lock lever 22, the mechanism must be capable of stopping the power release gear 18 at a precise moment to avoid any overtravel and mitigate the risk of unintendedly power releasing the latch 10. To achieve a precise stop in the lock/unlock mechanism, the reset lever 20 coupled to the power release gear 18 will have a cam surface that will contact switch 86, called the gear lock switch. This switch will be activated precisely at 35 degrees of rotation and will send a signal to the vehicle's door control unit (DCU) to stop the motor 12 and consequently the worm 16 and gear 18. In addition to the switch activation, the reset lever 20 coupled to the gear 18, will have integrated a "U" feature that will interact directly with the inside release lever spring 80; when the mechanism is about to reach the 35 degrees of rotation, this "U" feature will get trapped between its counterpart located in the spring. This feature located in the reset lever, will help to reassure that the mechanism stops at the desire moment. In addition to that, the reset lever will have installed a power release bumper 82 to dampen the sound and impact load whenever the latch goes to the power release direction or back drive direction.

The bumper 82 of the reset lever 20 is configured to contact a feature located on an interior surface of the actuator housing 32.

Since the lock link lever 40 is operably coupled to the gear lock lever 22 via tab 38 of the lock link lever 40 rotational movement of the gear lock lever 22 causes linear movement of the lock link lever 40 in the direction of arrows 92.

A by-pass lever 94 is rotationally and slidably mounted to the lock link lever 40. The by-pass lever 94 has a tab portion 96 that slides within an opening 98 of a pawl release lever 100 as the lock link lever slides in the direction of arrows 92. The pawl release lever 100 is rotatably mounted to the latch housing 42. The pawl release lever 100 is operably coupled to a pawl lifter 102 that is operably coupled to a pawl 104. The pawl lifter 102 and the pawl 104 are rotatably mounted to a backing plate 106 of the vehicle latch 10. Movement of the pawl 104 from an engaged position, where the pawl 104 engages a claw 108 of the latch 10, to an engaged position, where the pawl 104 no longer engages the claw 108 of the latch 10, allows the claw 108 to rotate from a closed position to an open position.

In one embodiment, the claw 108 and the pawl 104 are rotatably mounted to the backing plate 106 and the claw 108 is spring biased into the open position by a spring and the pawl 104 is spring biased into the engaged position by a spring. When the pawl 104 is in the engaged position a portion of the pawl 104 engages a portion of the claw 108 in order to prevent the claw 108 from rotating from the closed position to the open position. When the pawl 104 is moved into the disengaged position the portion of the pawl 104 no longer engages the portion of the claw 108 and the claw 108 is free to rotate from the closed position to the open position.

The by-pass lever 94 also has a feature 109 that is moveably received within an opening 110 of the lock link lever 40. When the lock link lever 40 is moved into the unlocked state by the gear lock lever 22 the by-pass lever 94 is moved by the lock link lever 40 such that tab portion 96 moves within opening so that it is in a position to be engaged by a tab portion 112 of the outside release lever 44. This position is illustrated in at least FIGS. 11 and 13A-14. As such, and when the outside release lever 44 is actuated the vehicle latch 10 will open.

Figure 10:
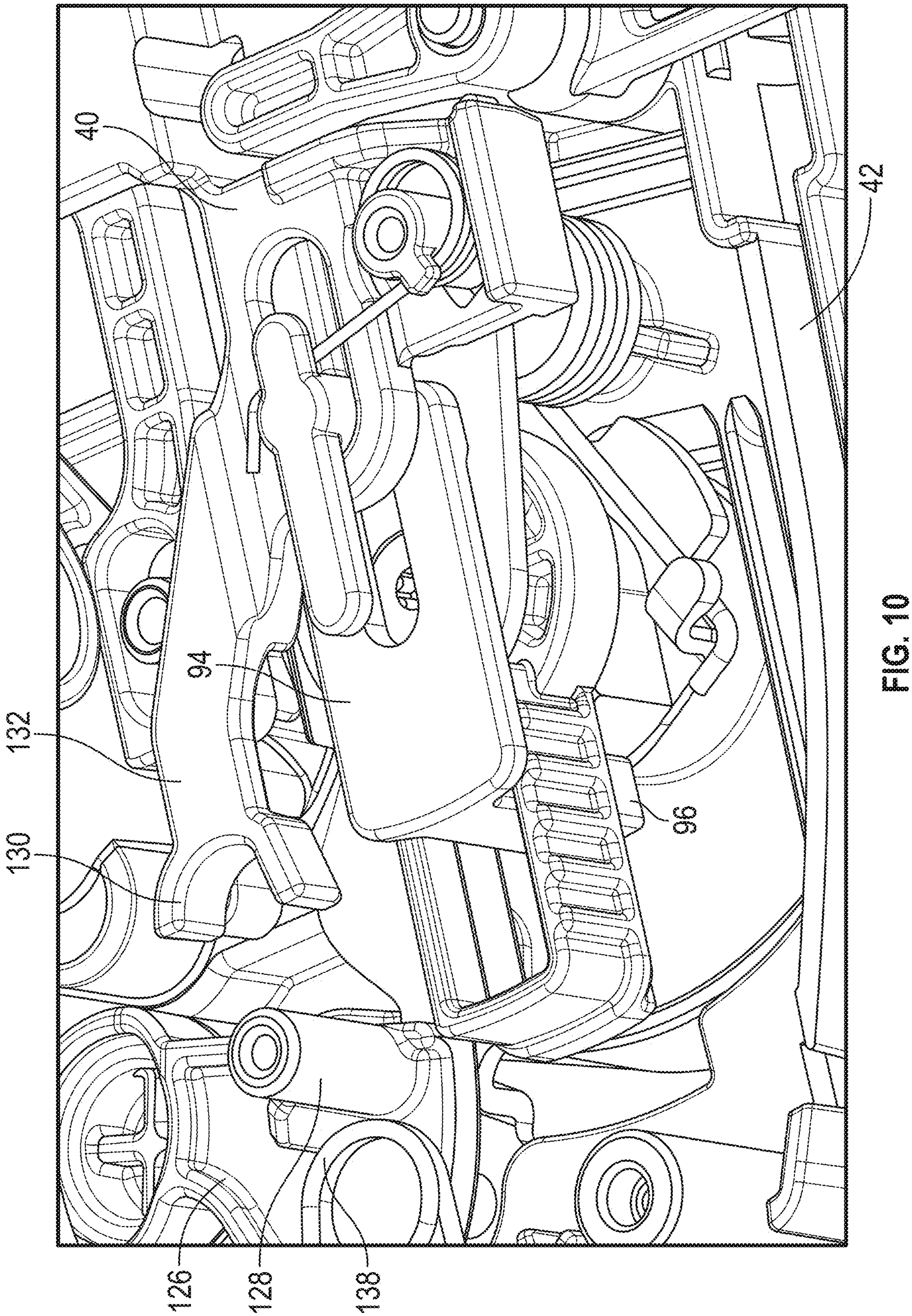
FIG. 10 is a perspective view of components of the vehicle latch in accordance with the present disclosure.
Figure 11:
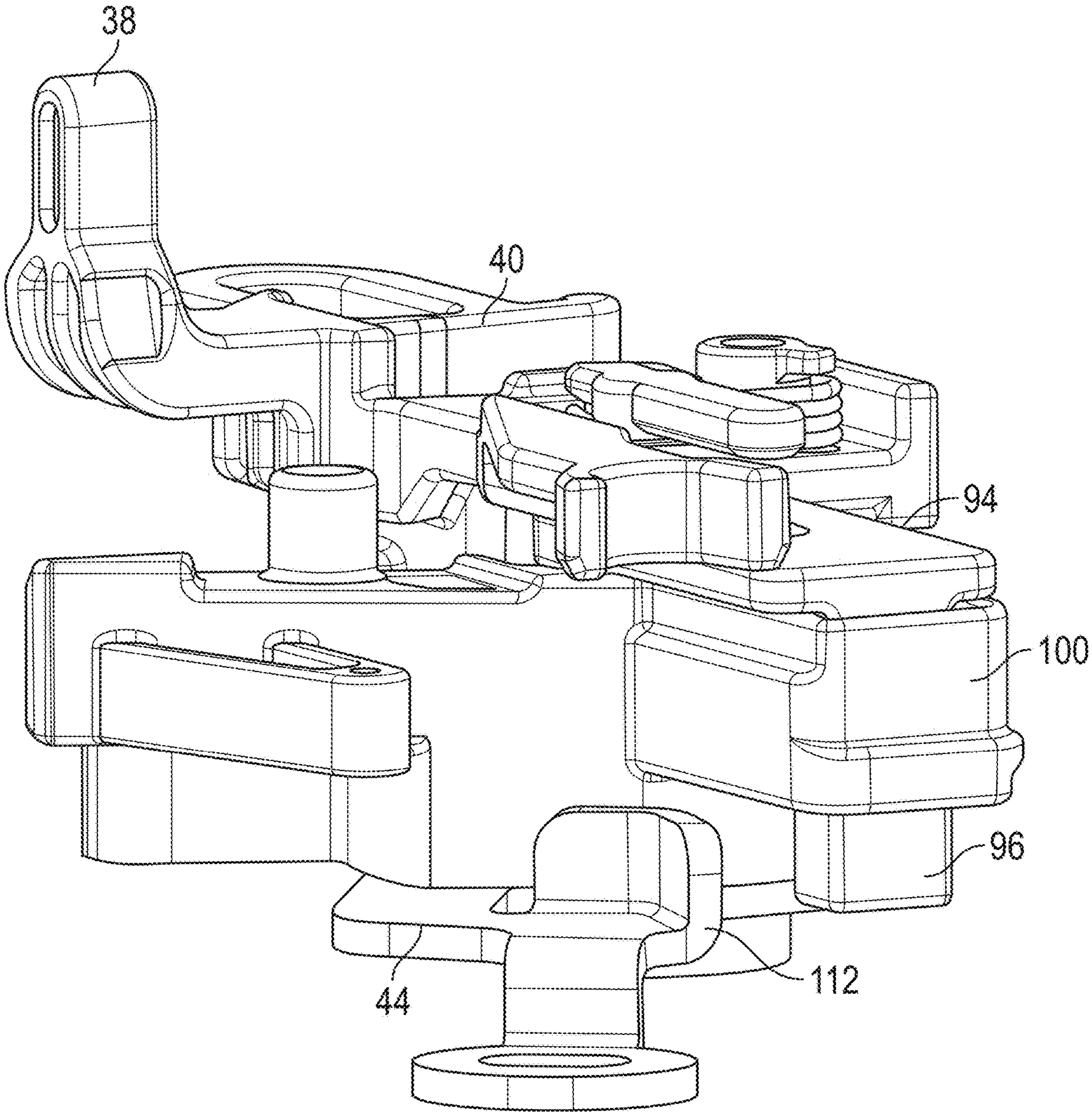
FIG. 11 is a perspective view of components of the vehicle latch in accordance with the present disclosure.
Figure 12A:
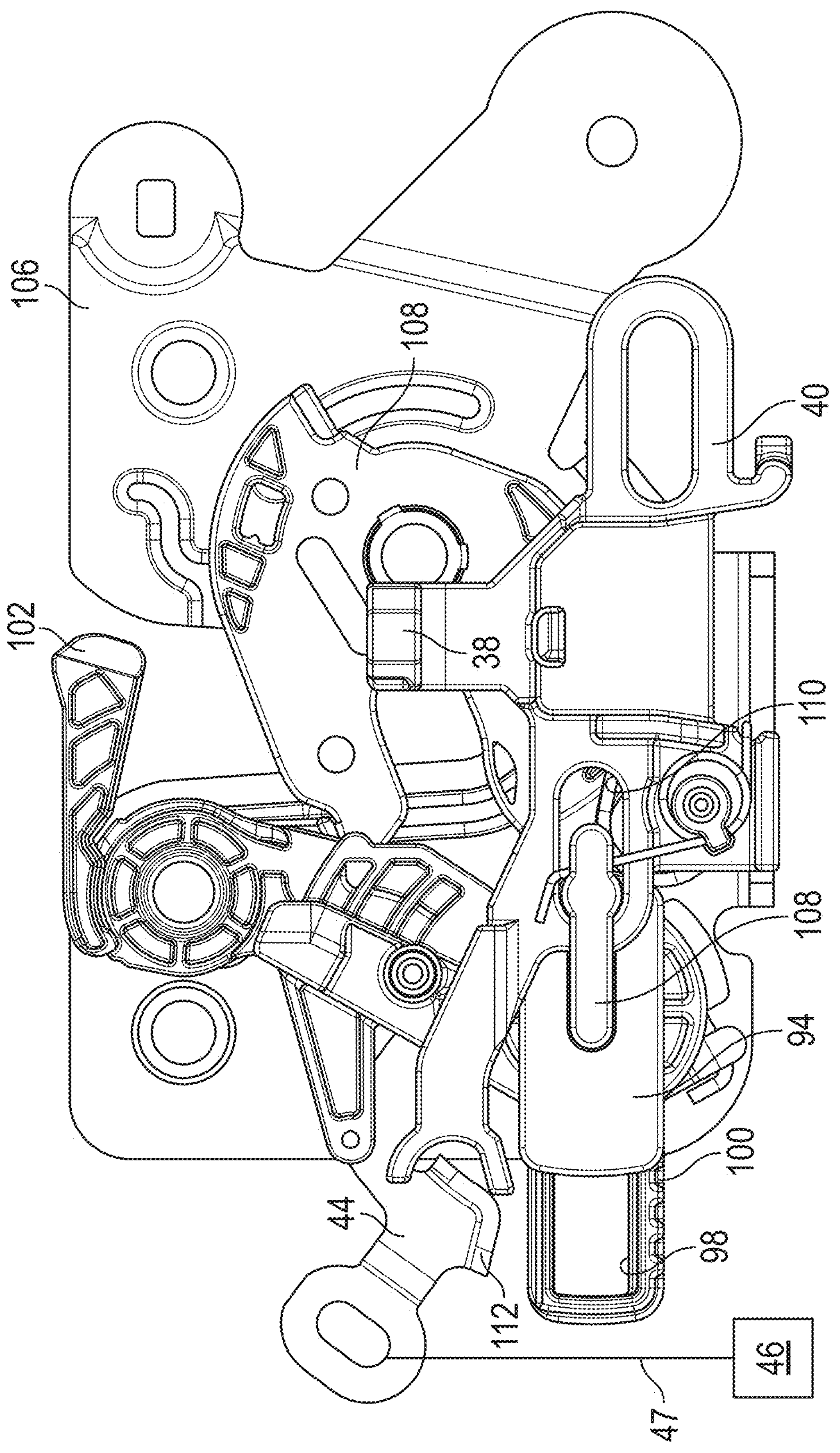
FIG. 12A illustrates the release lever of the vehicle latch when the vehicle latch is in the locked state.
Figure 12B:
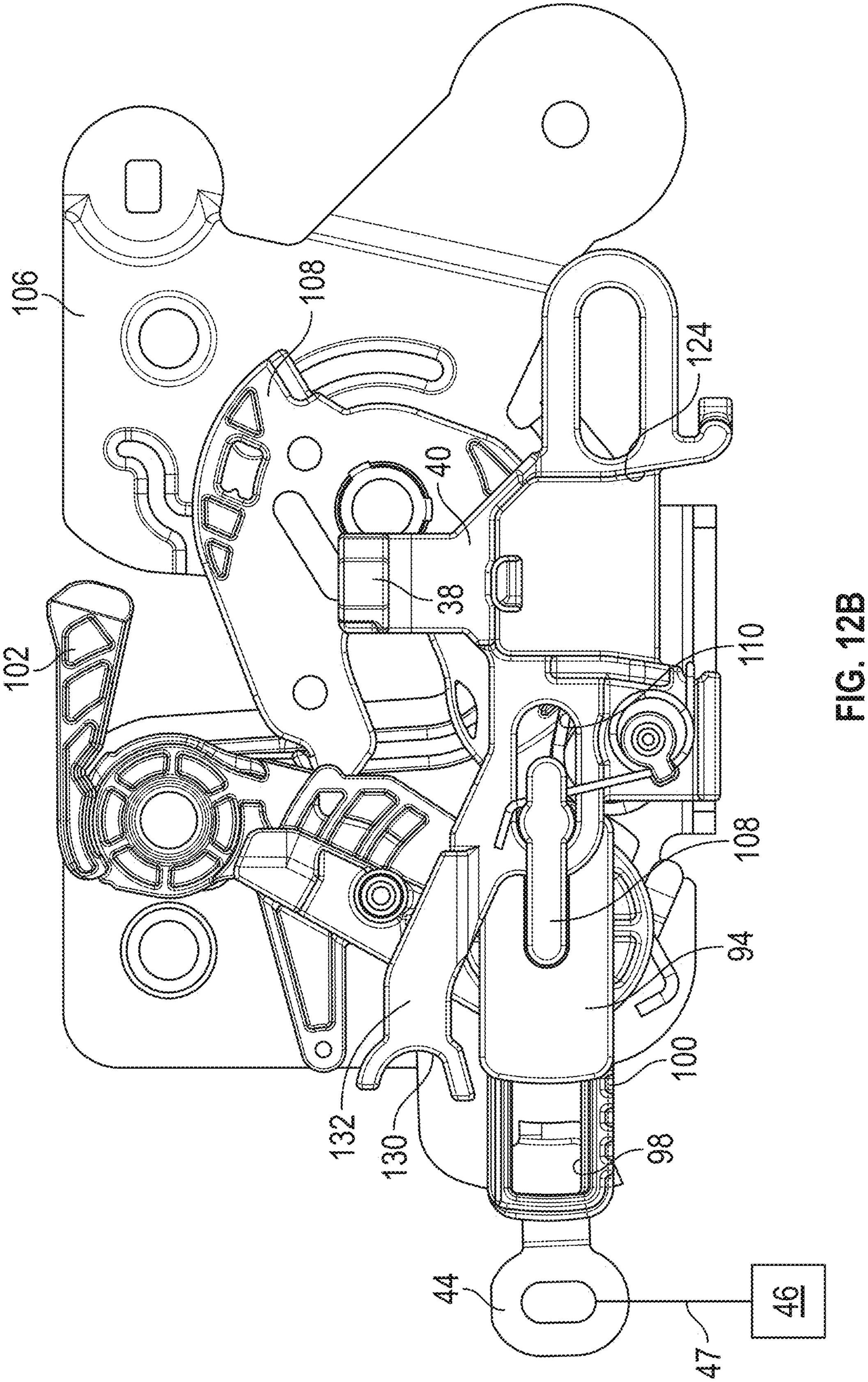
FIG. 12B illustrates operation of the release lever of the vehicle latch when the vehicle latch is in the locked state.
Figure 13A:
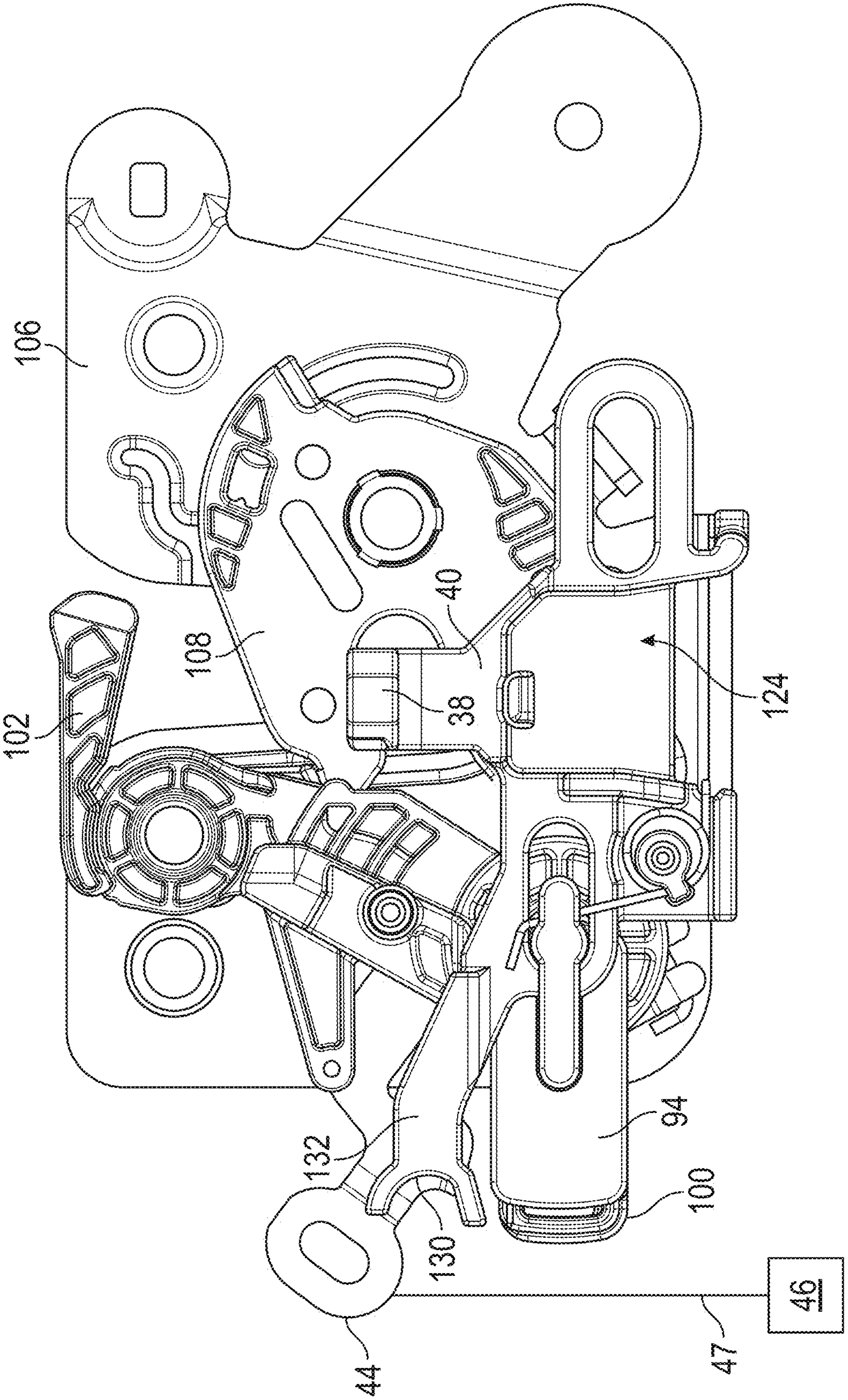
FIG. 13A illustrates the release lever of the vehicle latch when the vehicle latch is in the unlocked state.
Figure 13B:
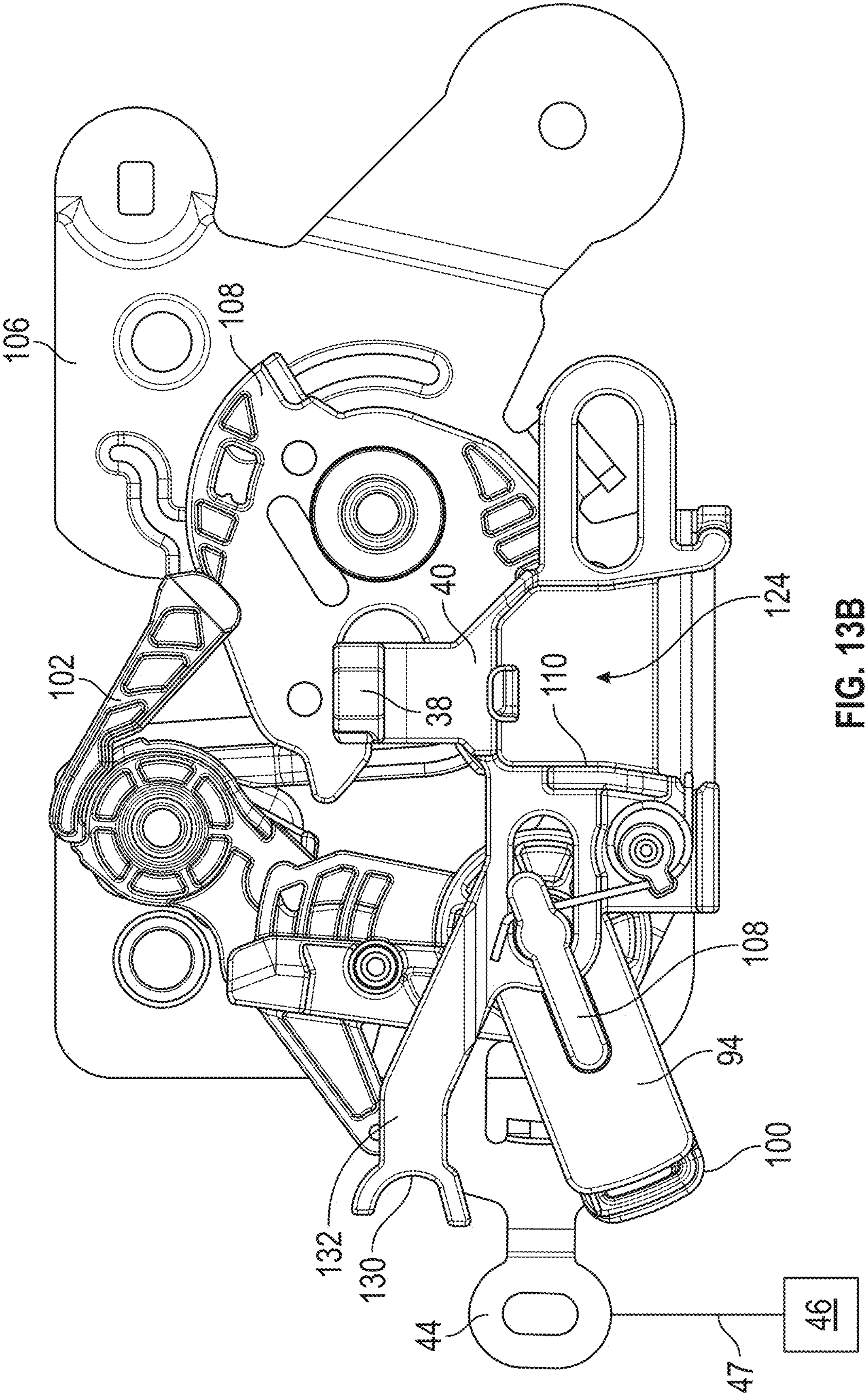
FIG. 13B illustrates operation of the release lever of the vehicle latch when the vehicle latch is in the unlocked state.
Figure 13C:
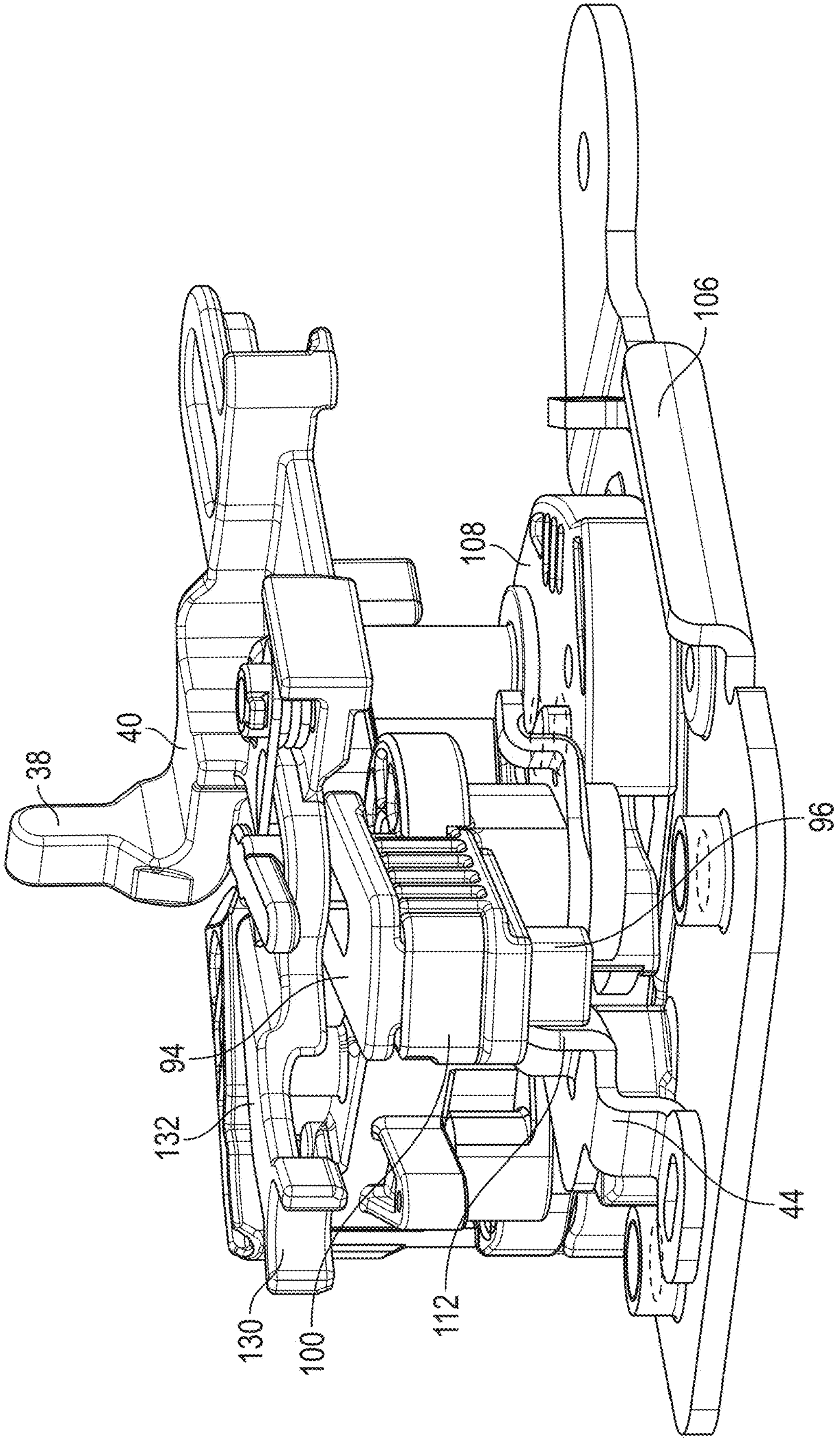
FIG. 13C illustrates operation of the release lever of the vehicle latch when the vehicle latch is in the unlocked state.
Figure 14:
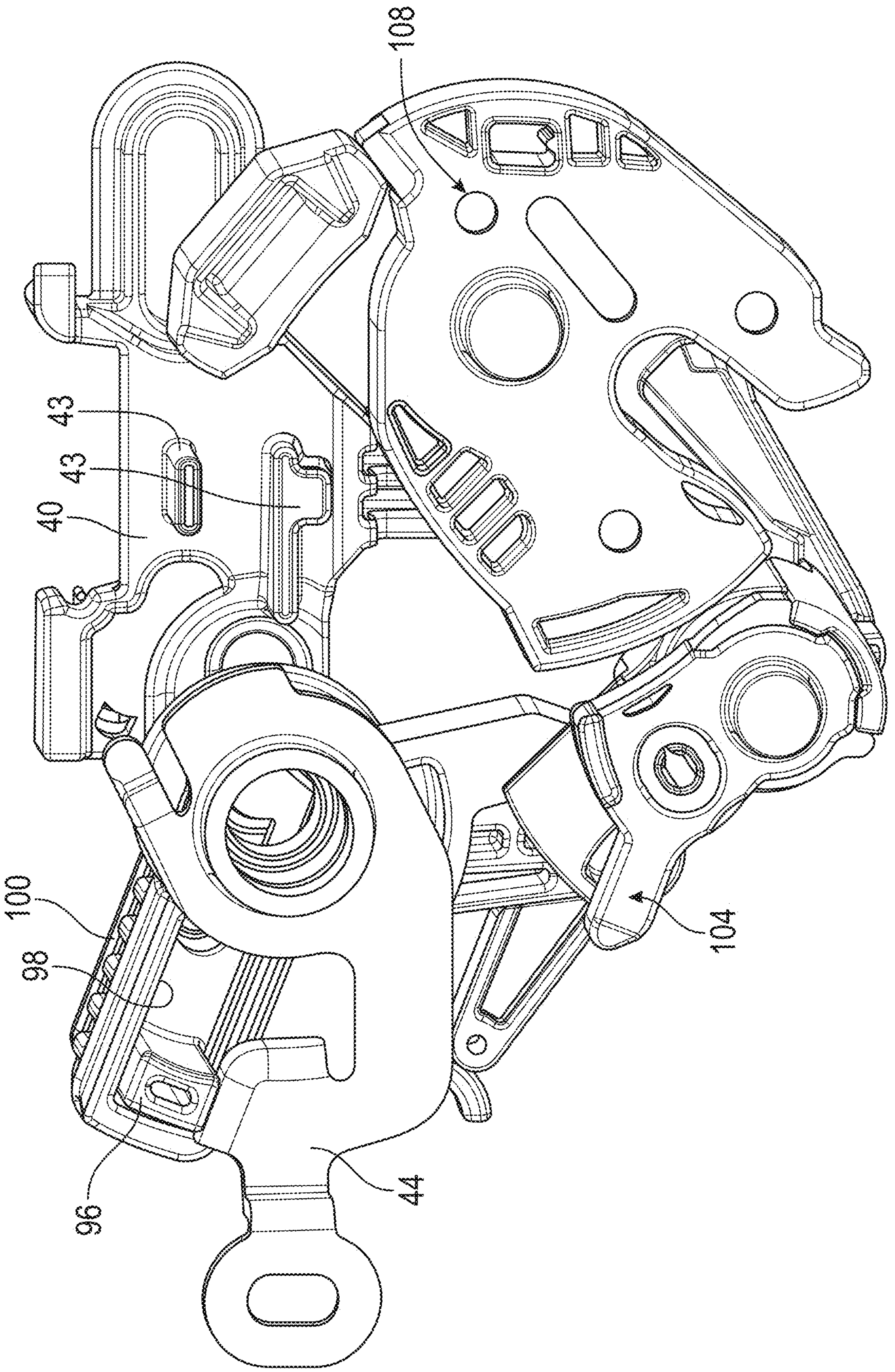
FIG. 14 illustrates operation of the release lever of the vehicle latch when the vehicle latch is in the unlocked state.
Figure 15:
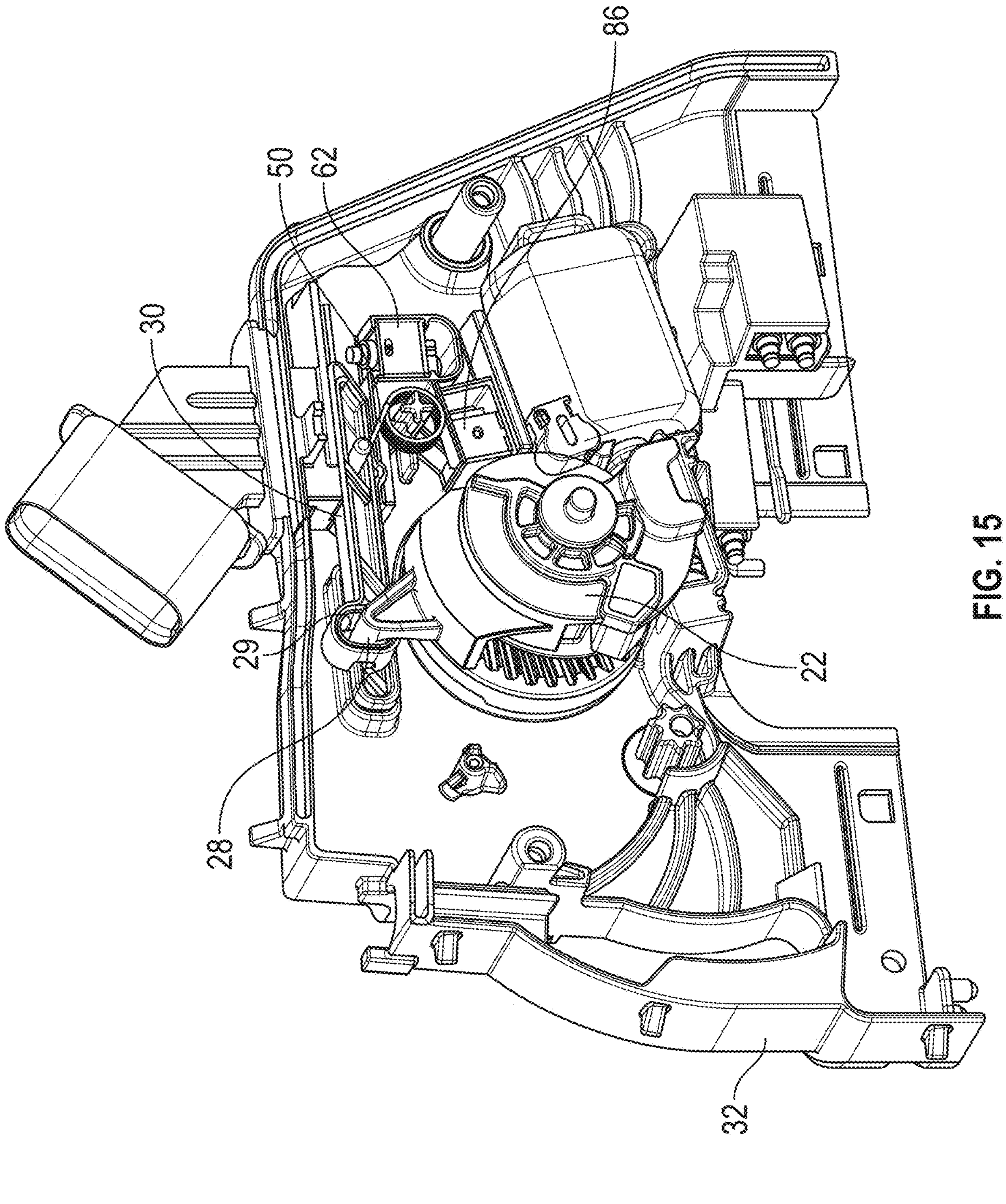
FIG. 15 is a perspective view of portions of the vehicle latch in accordance with the present disclosure.
Figure 17:
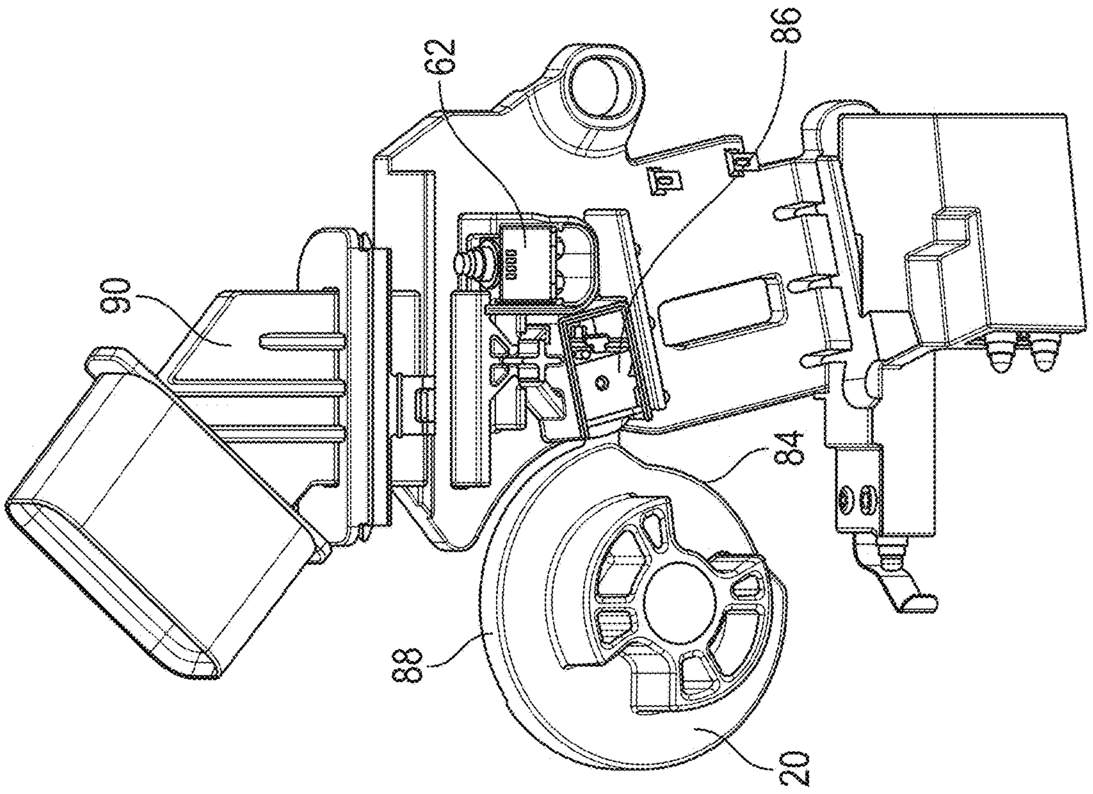
FIGS. 16 and 17 are perspective views of portions of the vehicle latch in accordance with the present disclosure illustrating movement the reset lever.

When the lock link lever 40 is moved into the locked state by the gear lock lever 22, the by-pass lever 94 is moved by the lock link lever 40 such that tab portion 96 moves within opening so that it is in a position not to be engaged by a tab portion 112 of the outside release lever 44. This position is illustrated in at least FIGS. 10, 12A and 12B. As such, and when the outside release lever 44 is actuated the vehicle latch 10 will not open.

During power release of the vehicle latch 10, the single motor 12 is actuated and the power release gear 18 is rotated until the cam feature 24 of the power release gear 18 contacts a power release lever 114 rotatably mounted to the actuator housing 32. The power release lever 114 is operably coupled to the pawl release lever 100 which is operably coupled to the pawl lifter 102 that is operably coupled to the pawl 104. As mentioned above, movement of the power release lever 114 will ultimately move the pawl 104.

Figure 22:
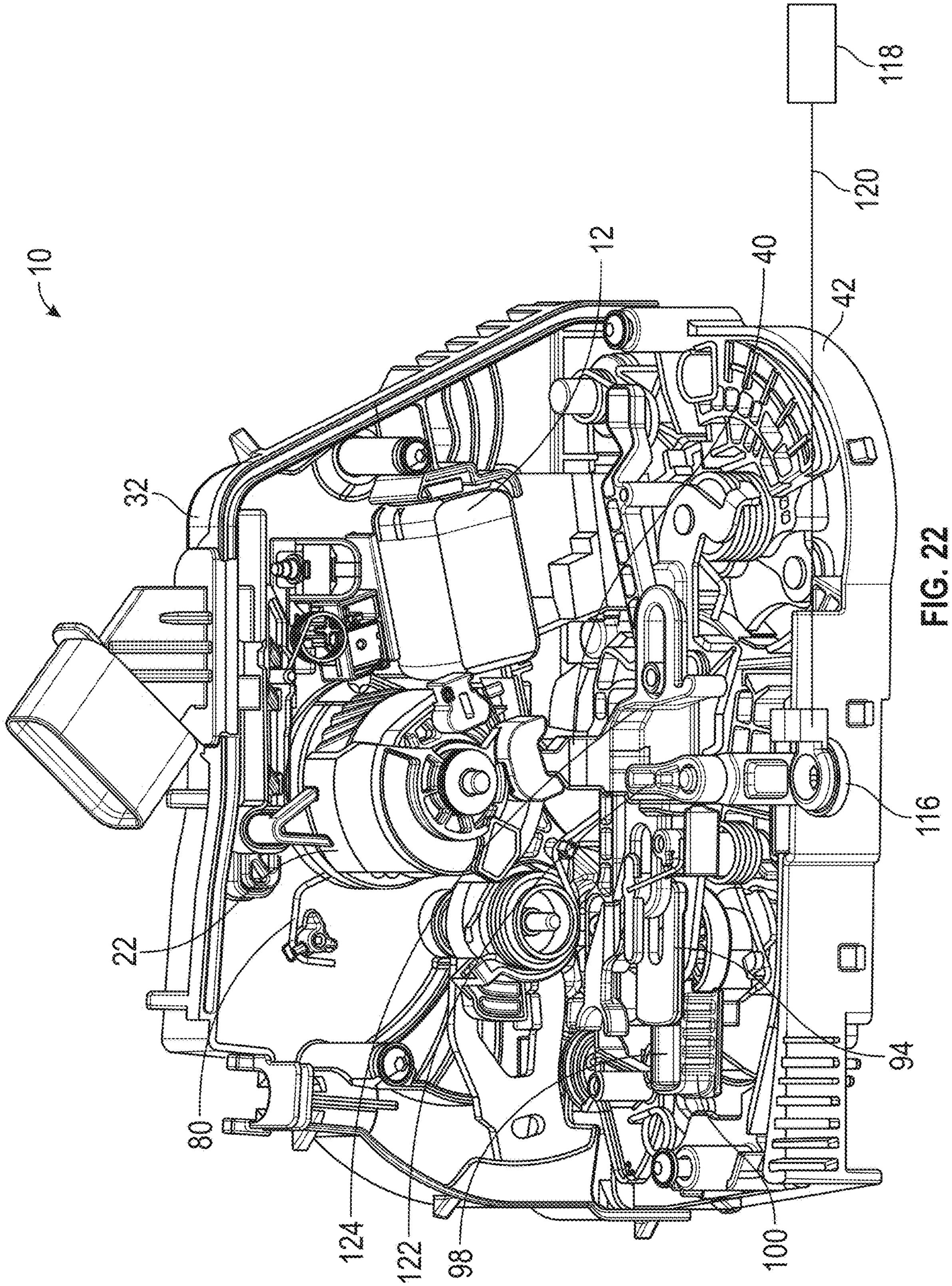
FIG. 22 is a perspective view of portions of the vehicle latch.
Figure 23:
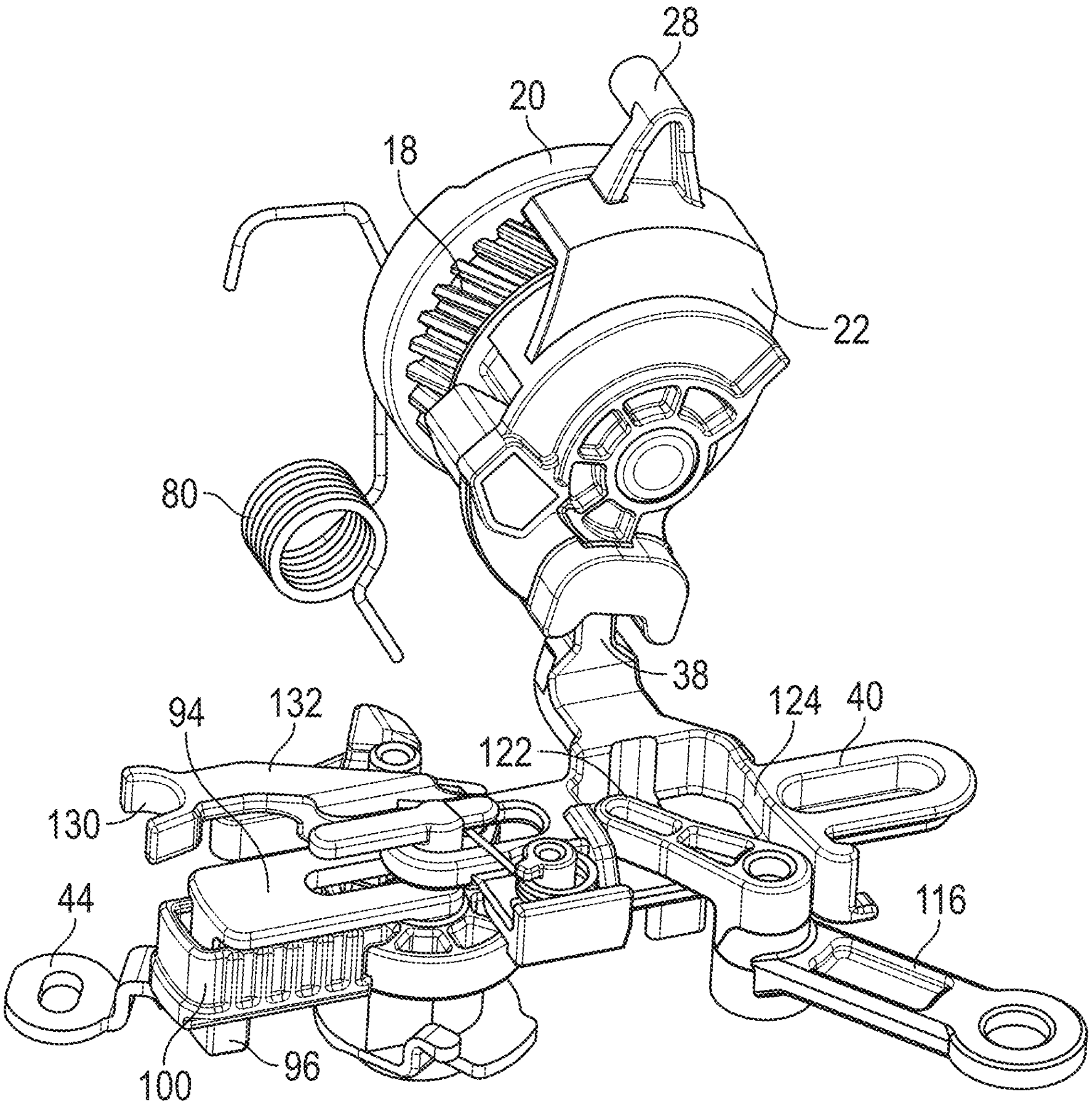
FIG. 23 is a perspective view of portions of the vehicle latch.
Figure 24:
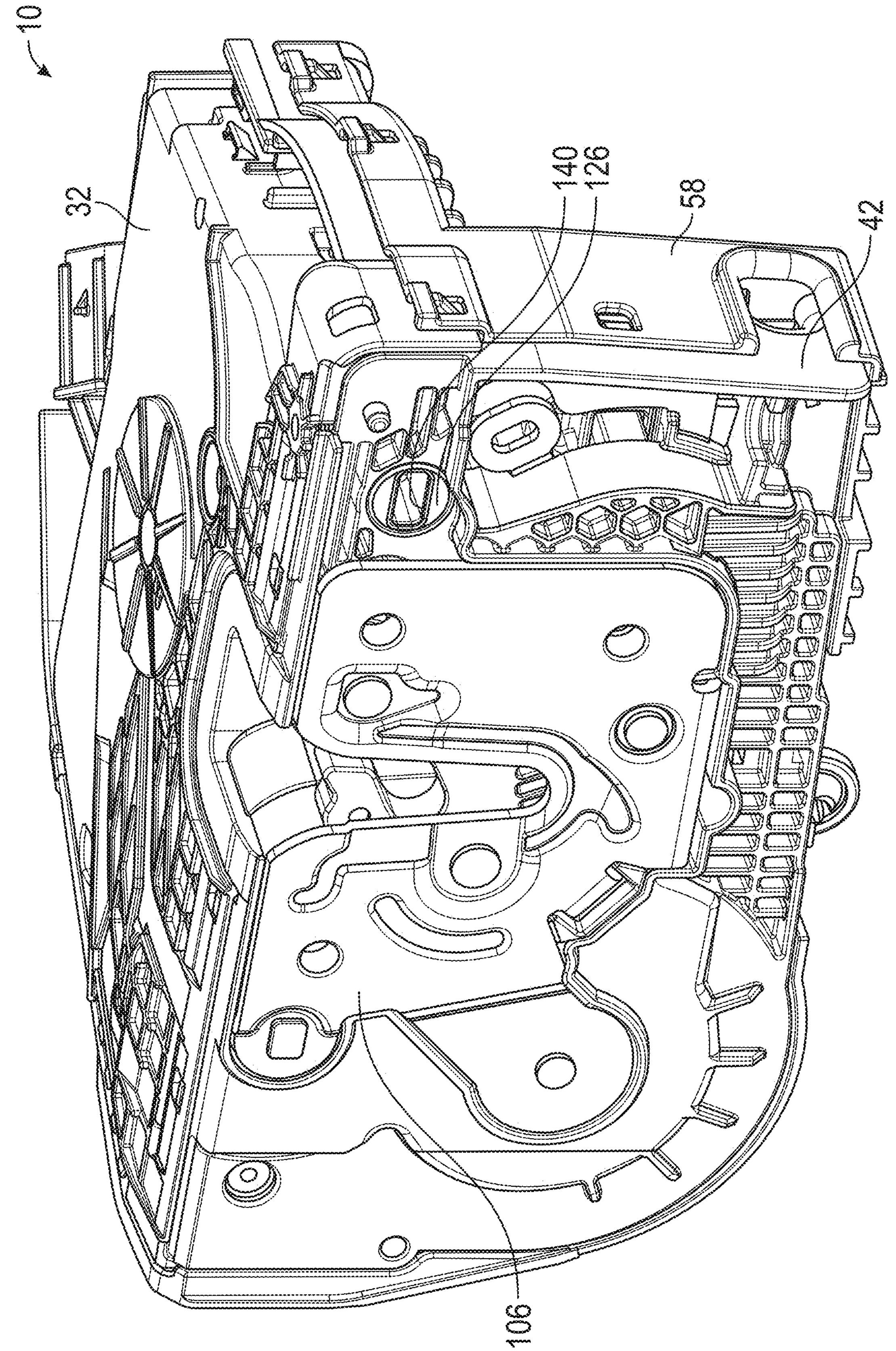
FIG. 24 is a perspective view of the vehicle latch in accordance with the present disclosure.
Figure 25A:
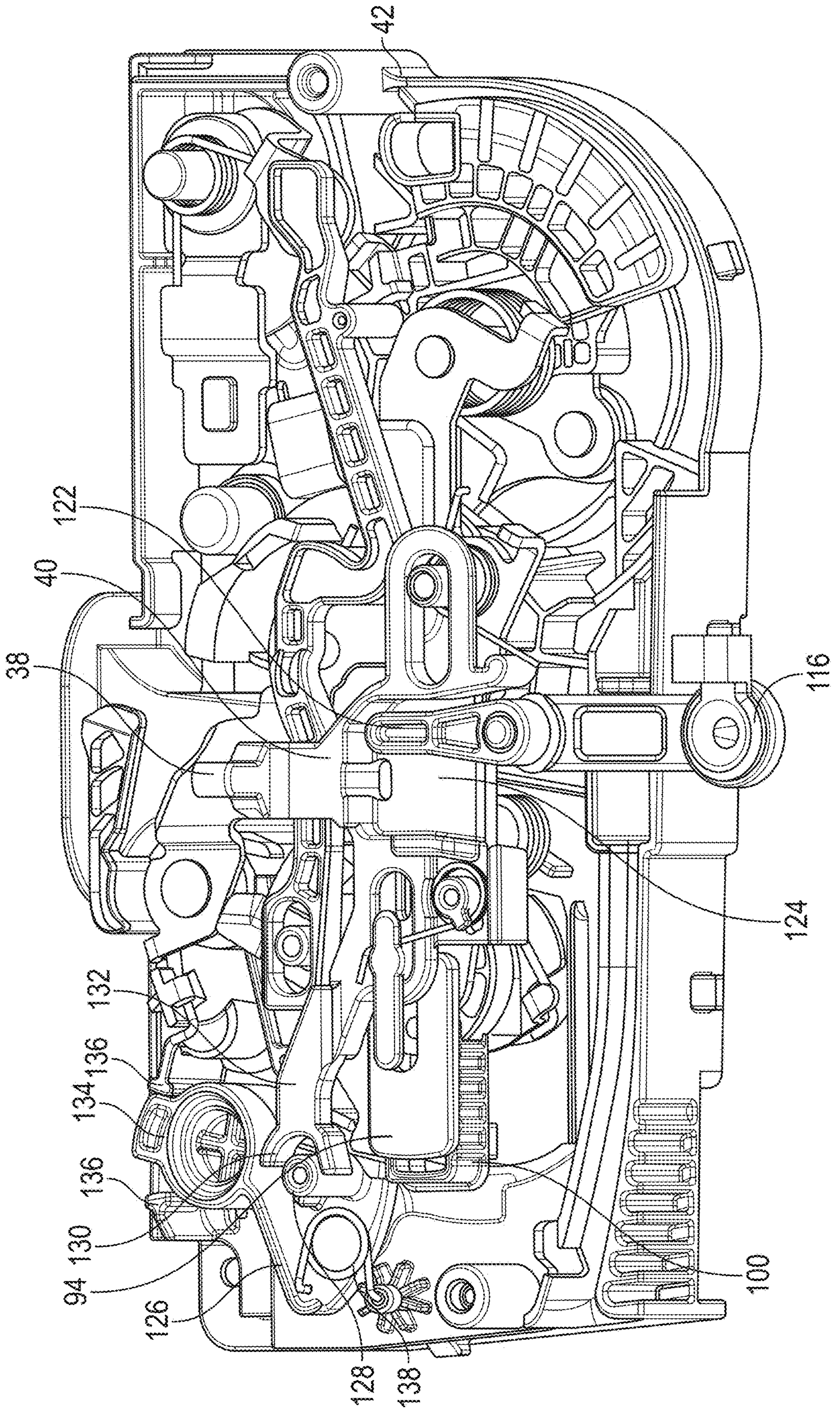
FIGS. 25A-28 illustrate movement of an emergency lock of the vehicle latch in accordance with the present disclosure.
Figure 25B:
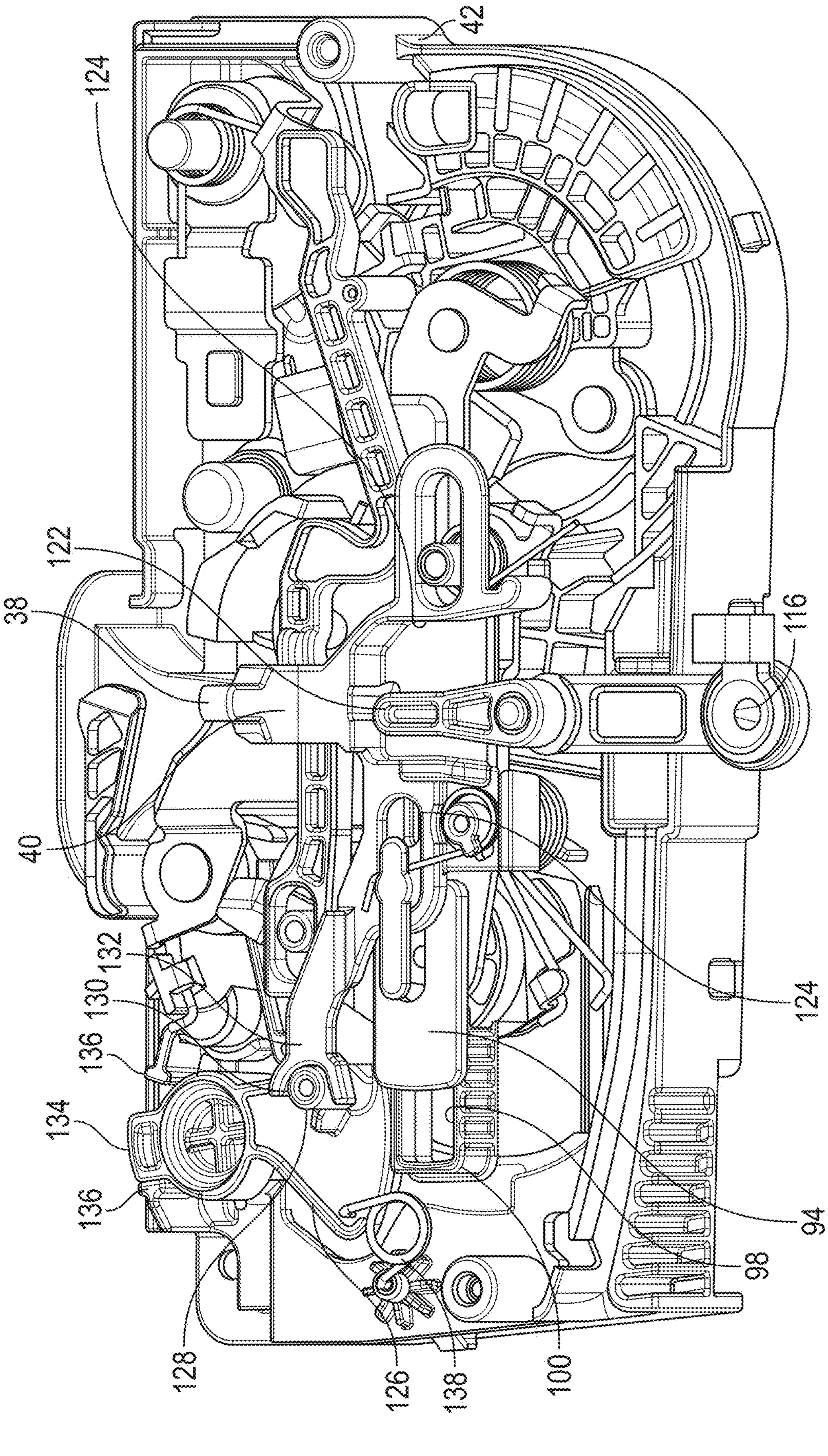
Figure 26:
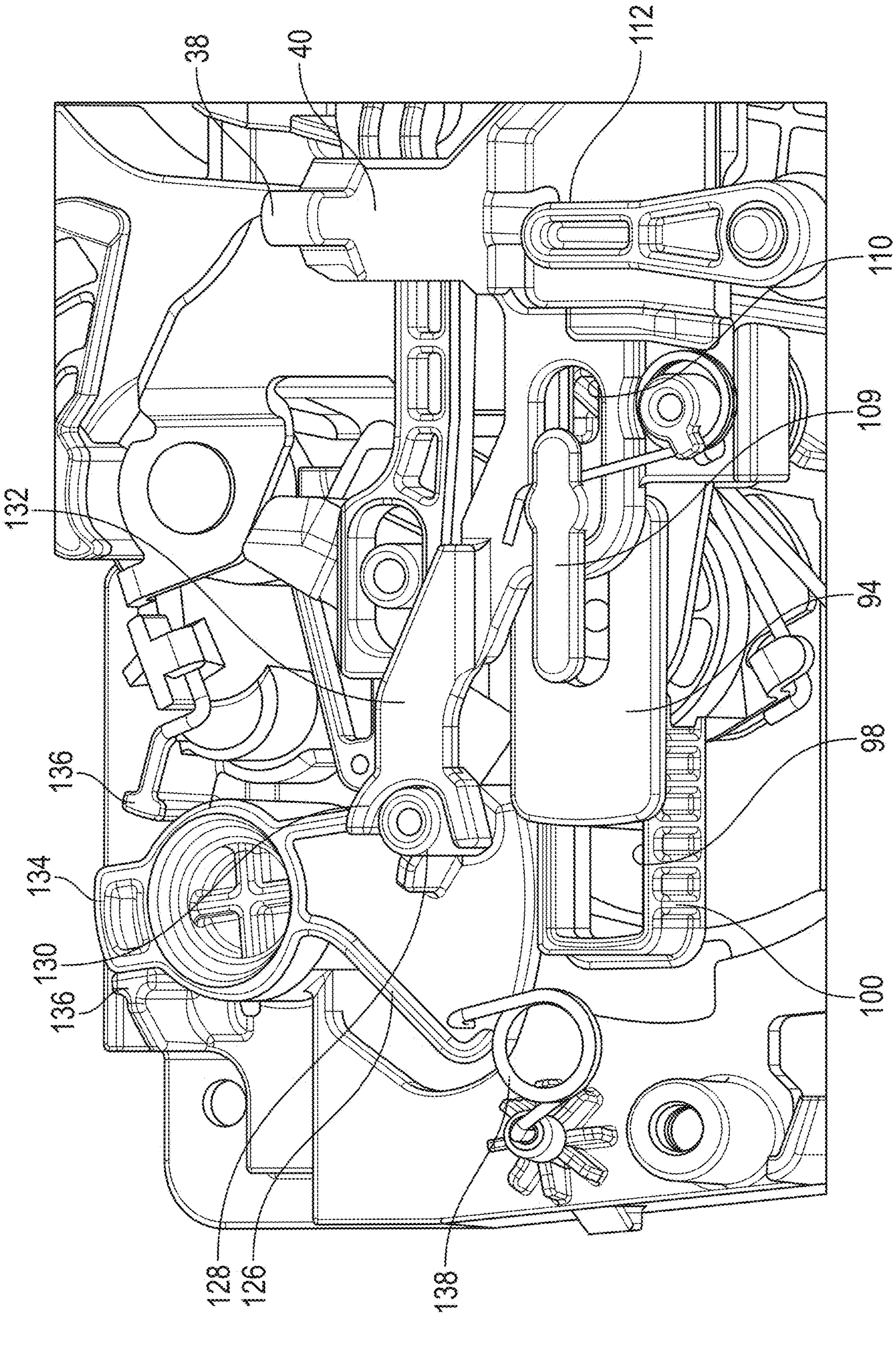
Figure 27:
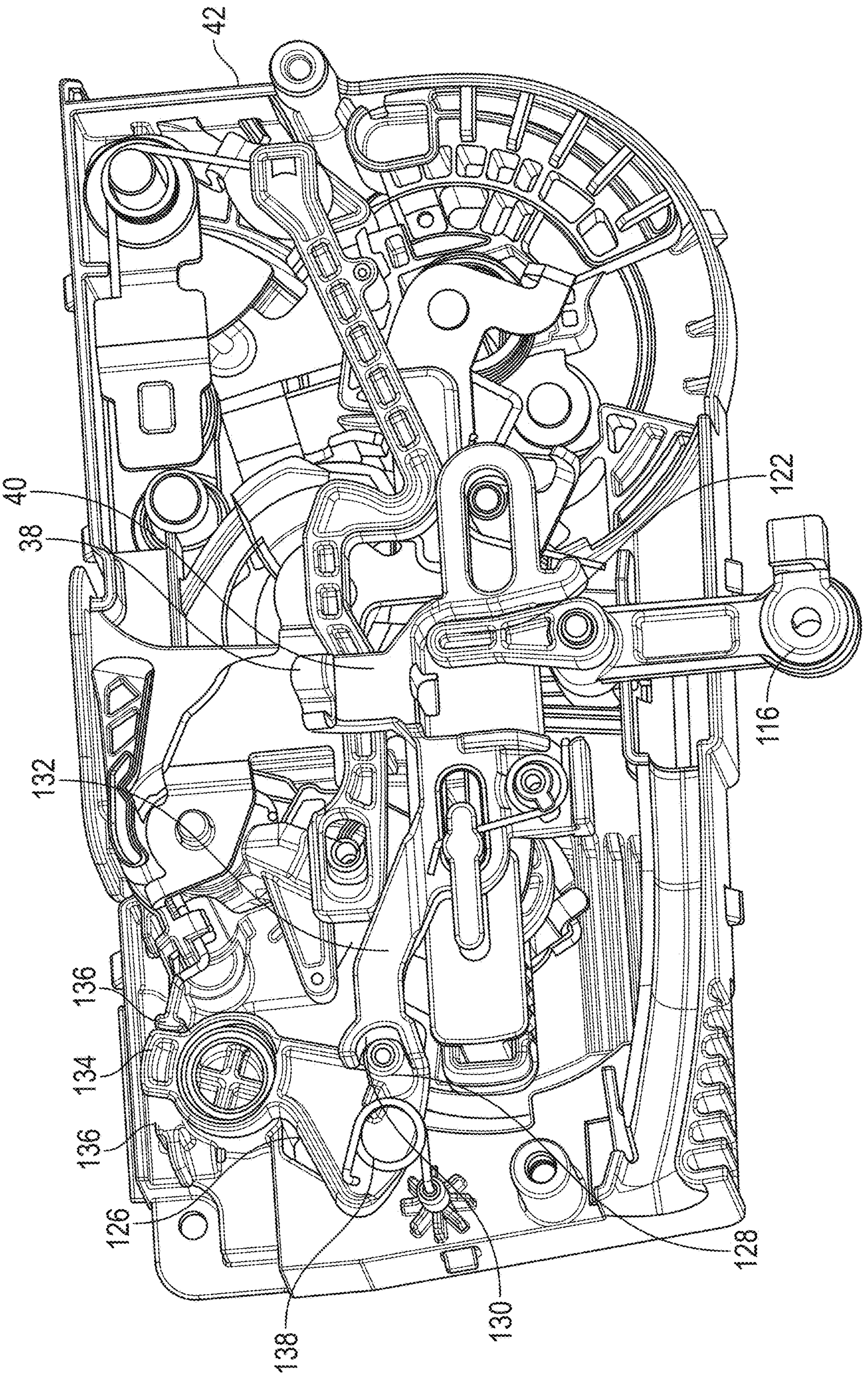
Figure 28:
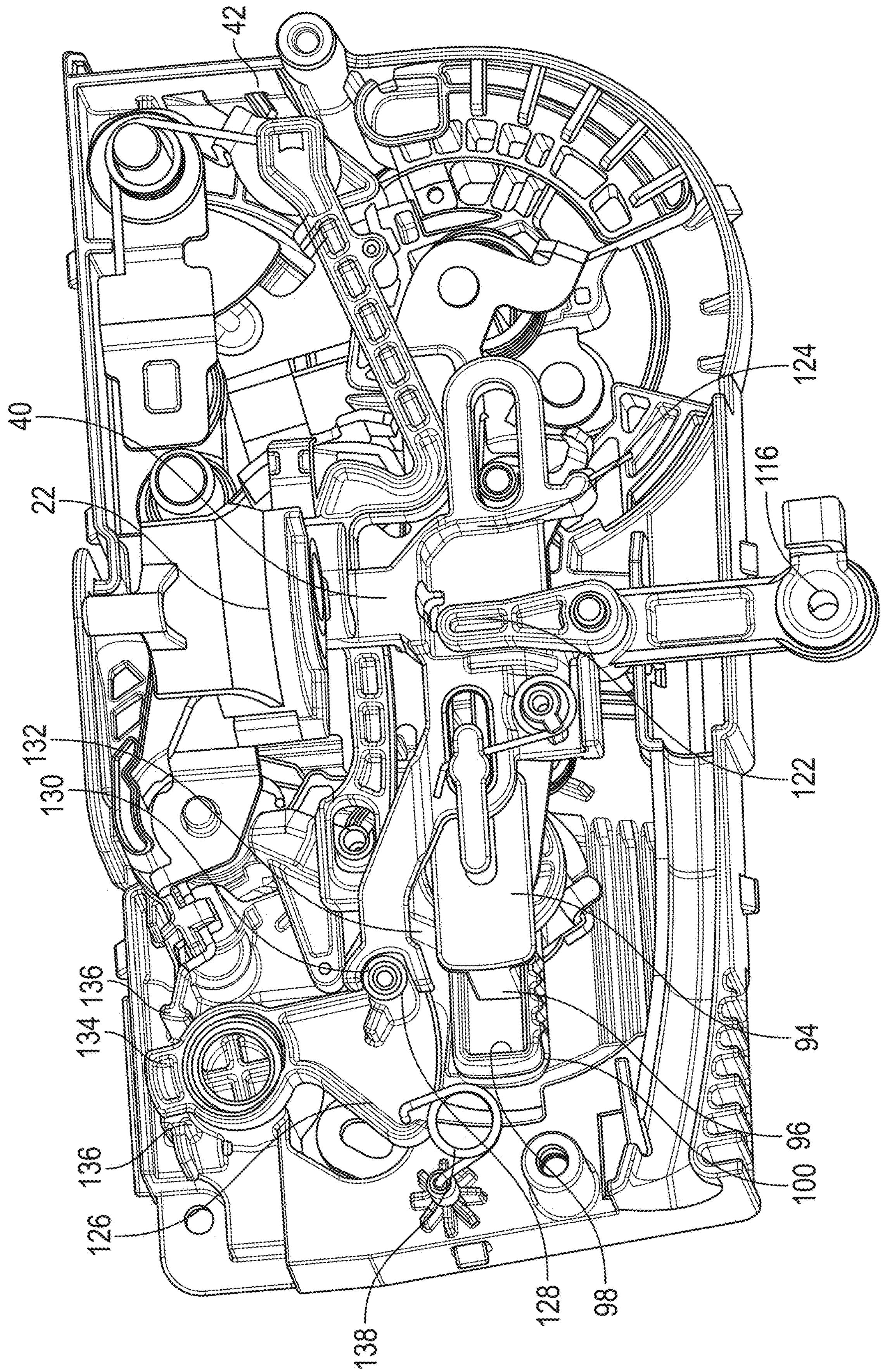

The vehicle latch 10 also includes a key cylinder lever 116. The key cylinder lever 116 is pivotally mounted to the latch housing portion 42. In addition, the key cylinder lever 116 is operably coupled to a key cylinder 118 via a rod 120 or any equivalent structure. The key cylinder lever 116 has a tab portion 122 that is received in a receiving area 124 of the lock link lever 40 such that actuation of the key cylinder lever 116 from a first position (illustrated in at least FIG. 22) to a second position (illustrated in at least FIG. 23) the tab portion 122 contacts a wall of the receiving area 124 which causes movement of the lock link lever 40, which moves the lock link lever 40 from the locked position (illustrated in at least FIG. 22) to the second position (illustrated in at least FIG. 23). The second position once again allows the outside release lever 44 to open the vehicle latch 10 as discussed above. The key cylinder function is particularly useful when the vehicle the vehicle latch is associated with has a power loss and manual unlocking of the vehicle latch 10 is desired.

The vehicle latch 10 also includes an emergency lock feature. The emergency lock feature is accessible from an exterior of the vehicle latch 10 and when actuated the emergency lock feature will transition the vehicle latch 10 from an unlocked state to a locked state. The emergency lock feature is provided by an emergency lock lever 126. The emergency lock lever 126 has a post member 128 that is configured to contact a C or U shaped receiving area 130 of the lock link lever 40. The C or U shaped receiving area 130 of the lock link lever 40 located on an arm member 132 of the lock link lever 40. The emergency lock lever 126 also has a feature 134 that contacts a pair of complimentary stop portions 136 of the housing portion 42 of the vehicle latch 10. An over center spring 138 is provided in order to keep the emergency lock lever 126 of the emergency lock mechanism in the locked position. The over center spring 126 provides a biasing force in order to keep the emergency lock lever 126 of the emergency lock mechanism in a locked position, which corresponds to the locked state of the vehicle latch. As illustrated in FIGS. 25A-28 movement of the emergency lock lever 126 will contact the lock link lever 40 in order to transition the vehicle latch 10 from the unlocked position to the locked position. The emergency lock lever 126 has a feature 140 that is accessible from an exterior of the vehicle latch 10. In one non-limiting embodiment, the feature 140 may be a slot or opening that is configured to receive a portion of a tool such as a screwdriver or other equivalent structure.

The emergency lock feature of the vehicle latch 10 allows a user to manipulate the vehicle latch 10 from an unlocked state to a locked state which again is useful in the event of a power loss to the vehicle the vehicle latch is secured to.

The term “about” is intended to include the degree of error associated with measurement of the particular quantity based upon the equipment available at the time of filing the application. For example, “about” can include a range of ±8% or 5%, or 2% of a given value.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle latch, comprising:

a drive assembly, the drive assembly includes a power release gear, a reset lever secured to one side of the power release gear and a gear lock lever located on an opposite side of the power release gear, the gear lock lever being capable of independent movement with respect to the power release gear and the reset lever;

a motor operably coupled to the drive assembly via a worm secured to a shaft of the motor, wherein rotation of the drive assembly by the worm performs one of a locking function and a power release of the vehicle latch;

a lock link lever, movably mounted to a housing portion of the vehicle latch, and the gear lock lever has a lower portion that has a receiving area operably coupled to a tab of a lock link lever;

a key cylinder lever, pivotally mounted to the latch housing portion, the key cylinder lever being operably coupled to a key cylinder via a rod, the key cylinder lever having a tab portion that is received in a receiving area of the lock link lever such that actuation of the key cylinder lever from a first position to a second position will cause the tab portion to contact a wall of the receiving area which causes movement of the lock link lever a locked position to an unlocked position, the key cylinder lever allows for manual unlocking of the vehicle latch; and an emergency lock lever accessible from an exterior of the vehicle latch, the emergency lock lever when actuated will transition the vehicle latch from an unlocked state to a locked state.

2. The vehicle latch as in claim 1, wherein the emergency lock lever has a post member that is configured to contact a receiving area of the lock link lever.

3. The vehicle latch as in claim 2, wherein the receiving area of the lock link lever is located on an arm member of the lock link lever.

4. The vehicle latch as in claim 3, wherein the emergency lock lever also has a feature that contacts a pair of complimentary stop portions of the housing portion of the vehicle latch.

5. The vehicle latch as in claim 4, further comprising an over center spring that provides a biasing force in order to keep the emergency lock lever in a locked position, which corresponds to the locked state of the vehicle latch.

6. The vehicle latch as in claim 5, wherein the emergency lock lever has a feature that is accessible from the exterior of the vehicle latch.

7. The vehicle latch as in claim 6, wherein a surface of the power release gear has a cam feature that engages a bumper of the gear lock lever when the drive assembly of the vehicle latch is in a locked position and the gear lock lever is in a home position.

8. The vehicle latch as in claim 7, wherein the gear lock lever has an upper tab member operably coupled to a switch link that is movably mounted to an actuator housing of the vehicle latch.

9. The vehicle latch as in claim 8, wherein the upper tab member is received within an opening of the switch link.

10. The vehicle latch as in claim 9, further comprising:

a primary switch that is operably coupled to a controller, wherein actuation of the primary switch by an outer periphery of the reset lever will send a signal to the controller that causes the motor to cease operation and indicate to the controller that the vehicle latch is in an unlocked state.

11. The vehicle latch as in claim 10, further comprising:

a secondary switch that is operably coupled to the controller, wherein actuation of the secondary switch by a cam surface of the switch link will send a signal to the controller that causes the motor to cease operation and indicate to the controller that the vehicle latch is in the unlocked state.

12. The vehicle latch as in claim 11, wherein the reset lever has a recessed periphery that does not contact the primary switch when the reset lever is in a locked position and the outer periphery of the reset lever contacts the primary switch when the reset lever is in an unlocked position.

13. The vehicle latch as in claim 12, wherein a surface of the power release gear has a cam feature that engages a bumper of the gear lock lever when the drive assembly of the vehicle latch is in a locked position and the gear lock lever is in a home position.

14. The vehicle latch as in claim 13, wherein the gear lock lever has an upper tab member operably coupled to the switch link.

15. The vehicle latch as in claim 14, wherein the upper tab member is received within an opening of the switch link.

16. The vehicle latch as in claim 15, wherein the actuator housing and the housing portion of the vehicle latch are separate components secured to each other.

17. The vehicle latch as in claim 16, wherein the actuator housing and the housing portion of the vehicle latch are integrally formed together as a single integral latch housing portion.

18. The vehicle latch as in claim 7, wherein movement of the lock link lever from a first position to a second position will allow the vehicle latch to be opened by an outside release lever pivotally mounted to the housing portion.

19. The vehicle latch as in claim 18, wherein when the power release gear is in a first position, the cam feature of the power release gear contacts the bumper of the gear lock lever which maintains the gear lock lever in the home position, which corresponds to the locked position of the drive assembly of the vehicle latch and when the power release gear is rotated and the cam feature no longer contacts the bumper the gear lock lever, the gear lock lever is spring biased into an unlock position by a lock link spring which provides a biasing force to a lock link lever movably mounted to a housing portion of the vehicle latch, and a switch link spring provides a biasing force to a switch link such that the lock link spring and the switch link spring will cause the gear lock lever to rotate when the power release gear is rotated and the cam feature no longer contacts the bumper the gear lock lever.

20. A method of operating a vehicle latch with only a single motor, comprising:

rotatably mounting a drive assembly to the vehicle latch, the drive assembly having a power release gear, a reset lever secured to one side of the power release gear and a gear lock lever located on an opposite side of the power release gear, the gear lock lever being capable of independent movement with respect to the power release gear and the reset lever;

operably coupling the single motor to the drive assembly via a worm secured to a shaft of the single motor, wherein rotation of the drive assembly by the worm performs one of a locking function and a power release of the vehicle latch;

movably mounting a lock link lever to a housing portion of the vehicle latch;

operably coupling a tab of a lock link lever to a lower portion of the gear lock lever;

pivotally mounting a key cylinder lever to the latch housing portion, the key cylinder lever being operably coupled to a key cylinder via a rod, the key cylinder lever having a tab portion that is received in a receiving area of the lock link lever such that actuation of the key cylinder lever from a first position to a second position will cause the tab portion to contact a wall of the receiving area which causes movement of the lock link lever a locked position to an unlocked position, the key cylinder lever allows for manual unlocking of the vehicle latch; and pivotally mounting an emergency lock lever to the vehicle latch, the emergency lock lever being accessible from an exterior of the vehicle latch, the emergency lock lever when actuated will transition the vehicle latch from an unlocked state to a locked state.

* * * * *